(12) United States Patent
Luo et al.

(10) Patent No.: US 12,133,216 B2
(45) Date of Patent: Oct. 29, 2024

(54) CONDITIONAL GRANTS IN INTEGRATED ACCESS AND BACKHAUL (IAB) NETWORK

(71) Applicant: QUALCOMM Incorporated, San Diego, CA (US)

(72) Inventors: Jianghong Luo, Skillman, NJ (US); Navid Abedini, Basking Ridge, NJ (US); Jing Sun, San Diego, CA (US); Xiaoxia Zhang, San Diego, CA (US); Junyi Li, Franklin Park, NJ (US); Tao Luo, San Diego, CA (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/319,955

(22) Filed: May 13, 2021

(65) Prior Publication Data
US 2022/0369333 A1 Nov. 17, 2022

(51) Int. Cl.
*H04W 72/1268* (2023.01)
*H04B 7/0413* (2017.01)
*H04W 72/23* (2023.01)

(52) U.S. Cl.
CPC ....... *H04W 72/1268* (2013.01); *H04B 7/0413* (2013.01); *H04W 72/23* (2023.01)

(58) Field of Classification Search
CPC ............. H04W 72/0426; H04W 16/02; H04W 72/1284; H04W 84/047; H04W 72/0406; H04L 5/0023; H04B 7/155
See application file for complete search history.

(56) References Cited

U.S. PATENT DOCUMENTS

| 2016/0100430 A1* | 4/2016 | Dabeer ............. H04W 28/0278 370/329 |
| 2020/0008218 A1* | 1/2020 | Shih ....................... H04W 72/21 |

(Continued)

FOREIGN PATENT DOCUMENTS

WO    2020144656 A1    7/2020

OTHER PUBLICATIONS

AT&T: "Enhancements on Multi Beam Operation", 3GPP Draft, 3GPP TSG RAN WG1 Meeting # 97, R1-1907156 Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Reno, Nevada, May 13, 2019-May 17, 2019 May 13, 2019 (May 13, 2019), 5 Pages, XP051728602, Retrieved from the Internet: URL: URL: https://www.3gpp.org/ftp/tsg_ran/WG1_RL1/TSGR1_97/Docs/R1-1907156.zip [retrieved on May 13, 2019] chapter 3.

(Continued)

*Primary Examiner* — Yee F Lam
(74) *Attorney, Agent, or Firm* — Muncy, Geissler, Olds & Lowe, P.C.

(57) ABSTRACT

In an aspect, a parent node sends a conditional grant for UL transmission to an IAB MT of IAB node. A triggering event for the conditional grant is based at least in part on a communication status of IAB DU of the IAB node (e.g., whether IAB DU is receiving or transmitting data, depending on IAB node duplex capability). In another aspect, IAB DU of IAB node sends a conditional grant for DL transmission to child node. A triggering event for the conditional grant is based at least in part on a communication status of IAB MT of the IAB node (e.g., whether IAB MT is receiving or transmitting data, depending on IAB node duplex capability).

30 Claims, 16 Drawing Sheets

(56) References Cited

U.S. PATENT DOCUMENTS

| | | | | |
|---|---|---|---|---|
| 2020/0145997 | A1* | 5/2020 | Luo | H04W 72/27 |
| 2020/0260328 | A1* | 8/2020 | Lee | H04W 28/0257 |
| 2021/0058826 | A1* | 2/2021 | Mao | H04W 28/0808 |
| 2022/0159485 | A1* | 5/2022 | Fujishiro | H04W 76/19 |

OTHER PUBLICATIONS

Ericsson: "IAB Semi-Static Configuration for DU Resources", 3GPP Draft, 3GPP TSG-RAN WG1 Meeting AH-1901, R1-1900732, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593579, 4 pages, Retrieved from the Internet: URL: http://www.3gpp.org/ftp/Meetings%5F3GPP%5FSYNC/RAN1/Docs/R1%2D1900732%2Ezip, [retrieved on Jan. 20, 2019], Section 4.
International Search Report and Written Opinion—PCT/US2022/071783—ISA/EPO—Jun. 28, 2022.
Qualcomm Incorporated: "Enhancements to Support NR Backhaul Links", 3GPP TSG RAN WG1 Meeting #95, R1-1813417, Spokane, USA, Nov. 16, 2018 (Nov. 16, 2018), 23 Pages, XP051555456, Retrieved from the Internet: URL: http://www.3gpp.org/ftp/Meetings%5F3GPP%5FSYNC/RAN1/Docs/R1%2D1813417%2Ezip. [Retrieved on Nov. 11, 2018], pp. 8-9, 5 Resource Management, Nov. 12, 2018-Nov. 16, 2018, sections 2-9.

* cited by examiner

CONDITIONAL GRANTS IN INTEGRATED ACCESS AND BACKHAUL (IAB) NETWORK

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating an integrated access and backhaul (IAB) node comprising an IAB mobile terminal (MT) and an IAB distributed unit (DU) includes receiving, at the IAB MT from a parent node, a conditional grant associated with a set of conditional parameters for an uplink transmission from the IAB MT to the parent node, the conditional grant associated with a triggering event that is based at least in part on a communication status of the IAB DU: detecting the triggering event for triggering the conditional grant with at least one conditional parameter of the set of conditional parameters; and performing the uplink transmission in accordance with the at least one conditional parameter.

In some aspects, the set of conditional parameters comprises a plurality of candidate resources associated with the uplink transmission, and the at least one conditional parameter includes some or all of the plurality of candidate resources based at least in part on the communication status of the IAB DU.

In some aspects, the plurality of candidate resources includes MIMO layers supported by the IAB MT for the uplink transmission based on the communication status of the IAB DU.

In some aspects, the IAB node is a full-duplex capable IAB node.

In some aspects, the at least one conditional parameter comprises two MIMO layers for the uplink transmission if the IAB DU is not receiving data from any child node or is receiving data from a first subset of child nodes, or the at least one conditional parameter comprises a single MIMO layer for the uplink transmission if the IAB DU is receiving data from a second subset of child nodes.

In some aspects, the IAB node is a spatial-divisional multiplexing (SDM)-capable IAB node.

In some aspects, the at least one conditional parameter comprises two MIMO layers for the uplink transmission if the IAB DU is not transmitting data to any child node, or the at least one conditional parameter comprises one MIMO layer for the uplink transmission if the IAB DU is transmitting data to any child node.

In some aspects, the set of conditional parameters includes a starting time of the uplink transmission, a number of MIMO layers, a transmission configuration indicator (TCI) state, a spatial relation indicator, a time location, a frequency location, a time-frequency location, or a combination thereof.

In an aspect, a method of operating a parent node in communication with an integrated access and backhaul (IAB) network node that comprises an IAB mobile terminal (MT) and an IAB distributed unit (DU) includes transmitting, to the IAB MT, a conditional grant associated with a set of conditional parameters for an uplink transmission from the IAB MT to the parent node, the conditional grant associated with a triggering event that is based in part on a communication status of the IAB DU: monitoring for the uplink transmission on each of a plurality of candidate resources; and receiving the uplink transmission on some or all of the plurality of candidate resources.

In some aspects, the plurality of candidate resources includes MIMO layers supported by the IAB MT for the uplink transmission based on the communication status of the IAB DU.

In some aspects, the IAB node is a full-duplex capable IAB node.

In some aspects, the at least one conditional parameter comprises two MIMO layers for the uplink transmission if the IAB DU is not receiving data from any child node or is receiving data from a first subset of child nodes, or the at least one conditional parameter comprises a single MIMO layer for the uplink transmission if the IAB DU is receiving data from a second subset of child nodes.

In some aspects, the IAB node is a spatial-divisional multiplexing (SDM)-capable IAB node.

In some aspects, the at least one conditional parameter comprises two MIMO layers for the uplink transmission if the IAB DU is not transmitting data to any child node, or the at least one conditional parameter comprises one MIMO layer for the uplink transmission if the IAB DU is transmitting data to any child node.

In some aspects, the set of conditional parameters includes a starting time of the uplink transmission, a number of MIMO layers, a transmission configuration indicator (TCI) state, a spatial relation indicator, a time location, a frequency location, a time-frequency location, or a combination thereof.

In an aspect, a method of operating an integrated access and backhaul (IAB) node comprising an IAB mobile terminal (MT) and an IAB distributed unit (DU) includes transmitting, from the IAB DU to at least one child node, a conditional grant associated with a set of conditional parameters for a downlink transmission from the IAB DU to the at least one child node, the conditional grant associated with a triggering event that is based at least in part on a communication status of the IAB MT: detecting the triggering event for triggering the conditional grant with at least one conditional parameter of the set of conditional parameters; and performing the downlink transmission in accordance with the at least one conditional parameter.

In some aspects, the set of conditional parameters comprises a plurality of candidate resources associated with the uplink transmission, and the at least one conditional parameter includes some or all of the plurality of candidate resources based at least in part on the communication status of the IAB MT.

In some aspects, the plurality of candidate resources includes MIMO layers supported by the IAB DU for the downlink transmission based on the communication status of the IAB MT.

In some aspects, the IAB node is a full-duplex capable IAB node.

In some aspects, the at least one conditional parameter comprises two MIMO layers for the downlink transmission if the IAB MT is not receiving data from any parent node or is receiving data from a first subset of parent nodes, or the at least one conditional parameter comprises a single MIMO layer for the downlink transmission if the IAB MT is receiving data from a second subset of parent nodes.

In some aspects, the IAB node is a spatial-divisional multiplexing (SDM)-capable IAB node.

In some aspects, the at least one conditional parameter comprises two MIMO layers for the downlink transmission if the IAB MT is not transmitting data, or the at least one conditional parameter comprises one MIMO layer for the downlink transmission if the IAB MT is transmitting data.

In some aspects, the set of conditional parameters includes a starting time of the downlink transmission, a number of MIMO layers, a transmission configuration indicator (TCI) state, a spatial relation indicator, a time location, a frequency location, a time-frequency location, or a combination thereof.

In an aspect, a method of operating a child node in communication with an integrated access and backhaul (IAB) network node that comprises an IAB mobile terminal (MT) and an IAB distributed unit (DU) includes receiving, from the IAB DU, a conditional grant associated with a set of conditional parameters for a downlink transmission from the IAB DU to the child node, the conditional grant associated with a triggering event that is based at least in part on a communication status of the IAB MT: monitoring for the downlink transmission on each of a plurality of candidate resources; and receiving the downlink transmission on some or all of the plurality of candidate resources.

In some aspects, the plurality of candidate resources includes MIMO layers supported by the IAB DU for the downlink transmission based on the communication status of the IAB MT.

In some aspects, the IAB node is a full-duplex capable IAB node.

In some aspects, the at least one conditional parameter comprises two MIMO layers for the downlink transmission if the IAB MT is not receiving data from any parent node or is receiving data from a first subset of parent nodes, or the at least one conditional parameter comprises a single MIMO layer for the downlink transmission if the IAB MT is receiving data from a second subset of parent nodes.

In some aspects, the IAB node is a spatial-divisional multiplexing (SDM)-capable IAB node.

In some aspects, the at least one conditional parameter comprises two MIMO layers for the downlink transmission if the IAB MT is not transmitting data, or the at least one conditional parameter comprises one MIMO layer for the downlink transmission if the IAB MT is transmitting data.

In some aspects, the set of conditional parameters includes a starting time of the downlink transmission, a number of MIMO layers, a transmission configuration indicator (TCI) state, a spatial relation indicator, a time location, a frequency location, a time-frequency location, or a combination thereof.

In an aspect, an integrated access and backhaul (IAB) node comprising an IAB mobile terminal (MT) and an IAB distributed unit (DU) includes a memory: at least one transceiver; and at least one processor communicatively coupled to the memory and the at least one transceiver, the at least one processor configured to: receive, via the at least one transceiver, at the IAB MT from a parent node, a conditional grant associated with a set of conditional parameters for an uplink transmission from the IAB MT to the parent node, the conditional grant associated with a triggering event that is based at least in part on a communication status of the IAB DU: detect the triggering event for triggering the conditional grant with at least one conditional parameter of the set of conditional parameters; and perform the uplink transmission in accordance with the at least one conditional parameter.

In some aspects, the set of conditional parameters comprises a plurality of candidate resources associated with the uplink transmission, and the at least one conditional parameter includes some or all of the plurality of candidate resources based at least in part on the communication status of the IAB DU.

In some aspects, the plurality of candidate resources includes MIMO layers supported by the IAB MT for the uplink transmission based on the communication status of the IAB DU.

In some aspects, the IAB node is a full-duplex capable IAB node.

In some aspects, the at least one conditional parameter comprises two MIMO layers for the uplink transmission if the IAB DU is not receiving data from any child node or is receiving data from a first subset of child nodes, or the at least one conditional parameter comprises a single MIMO layer for the uplink transmission if the IAB DU is receiving data from a second subset of child nodes.

In some aspects, the IAB node is a spatial-divisional multiplexing (SDM)-capable IAB node.

In some aspects, the at least one conditional parameter comprises two MIMO layers for the uplink transmission if the IAB DU is not transmitting data to any child node, or the at least one conditional parameter comprises one MIMO layer for the uplink transmission if the IAB DU is transmitting data to any child node.

In some aspects, the set of conditional parameters includes a starting time of the uplink transmission, a number of MIMO layers, a transmission configuration indicator (TCI) state, a spatial relation indicator, a time location, a frequency location, a time-frequency location, or a combination thereof.

In an aspect, a parent node in communication with an integrated access and backhaul (IAB) network node that comprises an IAB mobile terminal (MT) and an IAB distributed unit (DU) includes a memory: at least one transceiver; and at least one processor communicatively coupled to the memory and the at least one transceiver, the at least one processor configured to: transmit, via the at least one transceiver, to the IAB MT, a conditional grant associated with a set of conditional parameters for an uplink transmission from the IAB MT to the parent node, the conditional grant associated with a triggering event that is based in part on a communication status of the IAB DU: monitor for the uplink transmission on each of a plurality of candidate resources; and receive, via the at least one transceiver, the uplink transmission on some or all of the plurality of candidate resources.

In some aspects, the plurality of candidate resources includes MIMO layers supported by the IAB MT for the uplink transmission based on the communication status of the IAB DU.

In some aspects, the IAB node is a full-duplex capable IAB node.

In some aspects, the at least one conditional parameter comprises two MIMO layers for the uplink transmission if the IAB DU is not receiving data from any child node or is receiving data from a first subset of child nodes, or the at least one conditional parameter comprises a single MIMO layer for the uplink transmission if the IAB DU is receiving data from a second subset of child nodes.

In some aspects, the IAB node is a spatial-divisional multiplexing (SDM)-capable IAB node.

In some aspects, the at least one conditional parameter comprises two MIMO layers for the uplink transmission if the IAB DU is not transmitting data to any child node, or the at least one conditional parameter comprises one MIMO layer for the uplink transmission if the IAB DU is transmitting data to any child node.

In some aspects, the set of conditional parameters includes a starting time of the uplink transmission, a number of MIMO layers, a transmission configuration indicator (TCI) state, a spatial relation indicator, a time location, a frequency location, a time-frequency location, or a combination thereof.

In an aspect, an integrated access and backhaul (IAB) node comprising an IAB mobile terminal (MT) and an IAB distributed unit (DU) includes a memory: at least one transceiver; and at least one processor communicatively coupled to the memory and the at least one transceiver, the at least one processor configured to: transmit, via the at least one transceiver, from the IAB DU to at least one child node, a conditional grant associated with a set of conditional parameters for a downlink transmission from the IAB DU to the at least one child node, the conditional grant associated with a triggering event that is based at least in part on a communication status of the IAB MT: detect the triggering event for triggering the conditional grant with at least one conditional parameter of the set of conditional parameters; and perform the downlink transmission in accordance with the at least one conditional parameter.

In some aspects, the set of conditional parameters comprises a plurality of candidate resources associated with the uplink transmission, and the at least one conditional parameter includes some or all of the plurality of candidate resources based at least in part on the communication status of the IAB MT.

In some aspects, the plurality of candidate resources includes MIMO layers supported by the IAB DU for the downlink transmission based on the communication status of the IAB MT.

In some aspects, the IAB node is a full-duplex capable IAB node.

In some aspects, the at least one conditional parameter comprises two MIMO layers for the downlink transmission if the IAB MT is not receiving data from any parent node or is receiving data from a first subset of parent nodes, or the at least one conditional parameter comprises a single MIMO layer for the downlink transmission if the IAB MT is receiving data from a second subset of parent nodes.

In some aspects, the IAB node is a spatial-divisional multiplexing (SDM)-capable IAB node.

In some aspects, the at least one conditional parameter comprises two MIMO layers for the downlink transmission if the IAB MT is not transmitting data, or the at least one conditional parameter comprises one MIMO layer for the downlink transmission if the IAB MT is transmitting data.

In some aspects, the set of conditional parameters includes a starting time of the downlink transmission, a number of MIMO layers, a transmission configuration indicator (TCI) state, a spatial relation indicator, a time location, a frequency location, a time-frequency location, or a combination thereof.

In an aspect, a child node in communication with an integrated access and backhaul (IAB) network node that comprises an IAB mobile terminal (MT) and an IAB distributed unit (DU) includes a memory: at least one transceiver; and at least one processor communicatively coupled to the memory and the at least one transceiver, the at least one processor configured to: receive, via the at least one transceiver, from the IAB DU, a conditional grant associated with a set of conditional parameters for a downlink transmission from the IAB DU to the child node, the conditional grant associated with a triggering event that is based at least in part on a communication status of the IAB MT; monitor for the downlink transmission on each of a plurality of candidate resources; and receive, via the at least one transceiver, the downlink transmission on some or all of the plurality of candidate resources.

In some aspects, the plurality of candidate resources includes MIMO layers supported by the IAB DU for the downlink transmission based on the communication status of the IAB MT.

In some aspects, the IAB node is a full-duplex capable IAB node.

In some aspects, the at least one conditional parameter comprises two MIMO layers for the downlink transmission if the IAB MT is not receiving data from any parent node or is receiving data from a first subset of parent nodes, or the at least one conditional parameter comprises a single MIMO layer for the downlink transmission if the IAB MT is receiving data from a second subset of parent nodes.

In some aspects, the IAB node is a spatial-divisional multiplexing (SDM)-capable IAB node.

In some aspects, the at least one conditional parameter comprises two MIMO layers for the downlink transmission if the IAB MT is not transmitting data, or the at least one conditional parameter comprises one MIMO layer for the downlink transmission if the IAB MT is transmitting data.

In some aspects, the set of conditional parameters includes a starting time of the downlink transmission, a number of MIMO layers, a transmission configuration indicator (TCI) state, a spatial relation indicator, a time location, a frequency location, a time-frequency location, or a combination thereof.

In an aspect, an integrated access and backhaul (IAB) node comprising an IAB mobile terminal (MT) and an IAB distributed unit (DU) includes means for receiving, at the IAB MT from a parent node, a conditional grant associated with a set of conditional parameters for an uplink transmission from the IAB MT to the parent node, the conditional grant associated with a triggering event that is based at least in part on a communication status of the IAB DU: means for detecting the triggering event for triggering the conditional grant with at least one conditional parameter of the set of conditional parameters; and means for performing the uplink transmission in accordance with the at least one conditional parameter.

In some aspects, the set of conditional parameters comprises a plurality of candidate resources associated with the uplink transmission, and the at least one conditional parameter includes some or all of the plurality of candidate resources based at least in part on the communication status of the IAB DU.

In some aspects, the plurality of candidate resources includes MIMO layers supported by the IAB MT for the uplink transmission based on the communication status of the IAB DU.

In some aspects, the IAB node is a full-duplex capable IAB node.

In some aspects, the at least one conditional parameter comprises two MIMO layers for the uplink transmission if the IAB DU is not receiving data from any child node or is receiving data from a first subset of child nodes, or the at least one conditional parameter comprises a single MIMO layer for the uplink transmission if the IAB DU is receiving data from a second subset of child nodes.

In some aspects, the IAB node is a spatial-divisional multiplexing (SDM)-capable IAB node.

In some aspects, the at least one conditional parameter comprises two MIMO layers for the uplink transmission if the IAB DU is not transmitting data to any child node, or the at least one conditional parameter comprises one MIMO layer for the uplink transmission if the IAB DU is transmitting data to any child node.

In some aspects, the set of conditional parameters includes a starting time of the uplink transmission, a number of MIMO layers, a transmission configuration indicator (TCI) state, a spatial relation indicator, a time location, a frequency location, a time-frequency location, or a combination thereof.

In an aspect, a parent node in communication with an integrated access and backhaul (IAB) network node that comprises an IAB mobile terminal (MT) and an IAB distributed unit (DU) includes means for transmitting, to the IAB MT, a conditional grant associated with a set of conditional parameters for an uplink transmission from the IAB MT to the parent node, the conditional grant associated with a triggering event that is based in part on a communication status of the IAB DU: means for monitoring for the uplink transmission on each of a plurality of candidate resources; and means for receiving the uplink transmission on some or all of the plurality of candidate resources.

In some aspects, the plurality of candidate resources includes MIMO layers supported by the IAB MT for the uplink transmission based on the communication status of the IAB DU.

In some aspects, the IAB node is a full-duplex capable IAB node.

In some aspects, the at least one conditional parameter comprises two MIMO layers for the uplink transmission if the IAB DU is not receiving data from any child node or is receiving data from a first subset of child nodes, or the at least one conditional parameter comprises a single MIMO layer for the uplink transmission if the IAB DU is receiving data from a second subset of child nodes.

In some aspects, the IAB node is a spatial-divisional multiplexing (SDM)-capable IAB node.

In some aspects, the at least one conditional parameter comprises two MIMO layers for the uplink transmission if the IAB DU is not transmitting data to any child node, or the at least one conditional parameter comprises one MIMO layer for the uplink transmission if the IAB DU is transmitting data to any child node.

In some aspects, the set of conditional parameters includes a starting time of the uplink transmission, a number of MIMO layers, a transmission configuration indicator (TCI) state, a spatial relation indicator, a time location, a frequency location, a time-frequency location, or a combination thereof.

In an aspect, an integrated access and backhaul (IAB) node comprising an IAB mobile terminal (MT) and an IAB distributed unit (DU) includes means for transmitting, from the IAB DU to at least one child node, a conditional grant associated with a set of conditional parameters for a downlink transmission from the IAB DU to the at least one child node, the conditional grant associated with a triggering event that is based at least in part on a communication status of the IAB MT: means for detecting the triggering event for triggering the conditional grant with at least one conditional parameter of the set of conditional parameters; and means for performing the downlink transmission in accordance with the at least one conditional parameter.

In some aspects, the set of conditional parameters comprises a plurality of candidate resources associated with the uplink transmission, and the at least one conditional parameter includes some or all of the plurality of candidate resources based at least in part on the communication status of the IAB MT.

In some aspects, the plurality of candidate resources includes MIMO layers supported by the IAB DU for the downlink transmission based on the communication status of the IAB MT.

In some aspects, the IAB node is a full-duplex capable IAB node.

In some aspects, the at least one conditional parameter comprises two MIMO layers for the downlink transmission if the IAB MT is not receiving data from any parent node or is receiving data from a first subset of parent nodes, or the at least one conditional parameter comprises a single MIMO layer for the downlink transmission if the IAB MT is receiving data from a second subset of parent nodes.

In some aspects, the IAB node is a spatial-divisional multiplexing (SDM)-capable IAB node.

In some aspects, the at least one conditional parameter comprises two MIMO layers for the downlink transmission if the IAB MT is not transmitting data, or the at least one conditional parameter comprises one MIMO layer for the downlink transmission if the IAB MT is transmitting data.

In some aspects, the set of conditional parameters includes a starting time of the downlink transmission, a number of MIMO layers, a transmission configuration indicator (TCI) state, a spatial relation indicator, a time location, a frequency location, a time-frequency location, or a combination thereof.

In an aspect, a child node in communication with an integrated access and backhaul (IAB) network node that comprises an IAB mobile terminal (MT) and an IAB distributed unit (DU) includes means for receiving, from the IAB DU, a conditional grant associated with a set of conditional parameters for a downlink transmission from the IAB DU to the child node, the conditional grant associated with a triggering event that is based at least in part on a communication status of the IAB MT: means for monitoring for the downlink transmission on each of a plurality of candidate resources; and means for receiving the downlink transmission on some or all of the plurality of candidate resources.

In some aspects, the plurality of candidate resources includes MIMO layers supported by the IAB DU for the downlink transmission based on the communication status of the IAB MT.

In some aspects, the IAB node is a full-duplex capable IAB node.

In some aspects, the at least one conditional parameter comprises two MIMO layers for the downlink transmission if the IAB MT is not receiving data from any parent node or is receiving data from a first subset of parent nodes, or the at least one conditional parameter comprises a single MIMO layer for the downlink transmission if the IAB MT is receiving data from a second subset of parent nodes.

In some aspects, the IAB node is a spatial-divisional multiplexing (SDM)-capable IAB node.

In some aspects, the at least one conditional parameter comprises two MIMO layers for the downlink transmission if the IAB MT is not transmitting data, or the at least one conditional parameter comprises one MIMO layer for the downlink transmission if the IAB MT is transmitting data.

In some aspects, the set of conditional parameters includes a starting time of the downlink transmission, a number of MIMO layers, a transmission configuration indicator (TCI) state, a spatial relation indicator, a time location, a frequency location, a time-frequency location, or a combination thereof.

In an aspect, a non-transitory computer-readable medium storing computer-executable instructions that, when executed by an integrated access and backhaul (IAB) node comprising an IAB mobile terminal (MT) and an IAB distributed unit (DU), cause the IAB to: receive, at the IAB MT from a parent node, a conditional grant associated with a set of conditional parameters for an uplink transmission from the IAB MT to the parent node, the conditional grant associated with a triggering event that is based at least in part on a communication status of the IAB DU: detect the triggering event for triggering the conditional grant with at least one conditional parameter of the set of conditional parameters; and perform the uplink transmission in accordance with the at least one conditional parameter.

In some aspects, the set of conditional parameters comprises a plurality of candidate resources associated with the uplink transmission, and the at least one conditional parameter includes some or all of the plurality of candidate resources based at least in part on the communication status of the IAB DU.

In some aspects, the plurality of candidate resources includes MIMO layers supported by the IAB MT for the uplink transmission based on the communication status of the IAB DU.

In some aspects, the IAB node is a full-duplex capable IAB node.

In some aspects, the at least one conditional parameter comprises two MIMO layers for the uplink transmission if the IAB DU is not receiving data from any child node or is receiving data from a first subset of child nodes, or the at least one conditional parameter comprises a single MIMO layer for the uplink transmission if the IAB DU is receiving data from a second subset of child nodes.

In some aspects, the IAB node is a spatial-divisional multiplexing (SDM)-capable IAB node.

In some aspects, the at least one conditional parameter comprises two MIMO layers for the uplink transmission if the IAB DU is not transmitting data to any child node, or the at least one conditional parameter comprises one MIMO layer for the uplink transmission if the IAB DU is transmitting data to any child node.

In some aspects, the set of conditional parameters includes a starting time of the uplink transmission, a number of MIMO layers, a transmission configuration indicator (TCI) state, a spatial relation indicator, a time location, a frequency location, a time-frequency location, or a combination thereof.

In an aspect, a non-transitory computer-readable medium storing computer-executable instructions that, when executed by an parent node in communication with an integrated access and backhaul (IAB) network node that comprises an IAB mobile terminal (MT) and an IAB distributed unit (DU), cause the IAB to: transmit, to the IAB MT, a conditional grant associated with a set of conditional parameters for an uplink transmission from the IAB MT to the parent node, the conditional grant associated with a triggering event that is based in part on a communication status of the IAB DU: monitor for the uplink transmission on each of a plurality of candidate resources; and receive the uplink transmission on some or all of the plurality of candidate resources.

In some aspects, the plurality of candidate resources includes MIMO layers supported by the IAB MT for the uplink transmission based on the communication status of the IAB DU.

In some aspects, the IAB node is a full-duplex capable IAB node.

In some aspects, the at least one conditional parameter comprises two MIMO layers for the uplink transmission if the IAB DU is not receiving data from any child node or is receiving data from a first subset of child nodes, or the at least one conditional parameter comprises a single MIMO layer for the uplink transmission if the IAB DU is receiving data from a second subset of child nodes.

In some aspects, the IAB node is a spatial-divisional multiplexing (SDM)-capable IAB node.

In some aspects, the at least one conditional parameter comprises two MIMO layers for the uplink transmission if the IAB DU is not transmitting data to any child node, or the at least one conditional parameter comprises one MIMO layer for the uplink transmission if the IAB DU is transmitting data to any child node.

In some aspects, the set of conditional parameters includes a starting time of the uplink transmission, a number of MIMO layers, a transmission configuration indicator (TCI) state, a spatial relation indicator, a time location, a frequency location, a time-frequency location, or a combination thereof.

In an aspect, a non-transitory computer-readable medium storing computer-executable instructions that, when executed by an IAB, cause the IAB to: transmit, from the IAB DU to at least one child node, a conditional grant associated with a set of conditional parameters for a downlink transmission from the IAB DU to the at least one child node, the conditional grant associated with a triggering event that is based at least in part on a communication status of the IAB MT: detect the triggering event for triggering the conditional grant with at least one conditional parameter of the set of conditional parameters; and perform the downlink transmission in accordance with the at least one conditional parameter.

In some aspects, the set of conditional parameters comprises a plurality of candidate resources associated with the uplink transmission, and the at least one conditional parameter includes some or all of the plurality of candidate resources based at least in part on the communication status of the IAB MT.

In some aspects, the plurality of candidate resources includes MIMO layers supported by the IAB DU for the downlink transmission based on the communication status of the IAB MT.

In some aspects, the IAB node is a full-duplex capable IAB node.

In some aspects, the at least one conditional parameter comprises two MIMO layers for the downlink transmission if the IAB MT is not receiving data from any parent node or is receiving data from a first subset of parent nodes, or the at least one conditional parameter comprises a single MIMO layer for the downlink transmission if the IAB MT is receiving data from a second subset of parent nodes.

In some aspects, the IAB node is a spatial-divisional multiplexing (SDM)-capable IAB node.

In some aspects, the at least one conditional parameter comprises two MIMO layers for the downlink transmission if the IAB MT is not transmitting data, or the at least one conditional parameter comprises one MIMO layer for the downlink transmission if the IAB MT is transmitting data.

In some aspects, the set of conditional parameters includes a starting time of the downlink transmission, a number of MIMO layers, a transmission configuration indicator (TCI) state, a spatial relation indicator, a time location, a frequency location, a time-frequency location, or a combination thereof.

In an aspect, a non-transitory computer-readable medium storing computer-executable instructions that, when executed by an child node in communication with an integrated access and backhaul (IAB) network node that comprises an IAB mobile terminal (MT) and an IAB distributed unit (DU), cause the IAB to: receive, from the IAB DU, a conditional grant associated with a set of conditional parameters for a downlink transmission from the IAB DU to the child node, the conditional grant associated with a triggering event that is based at least in part on a communication status of the IAB MT; monitor for the downlink transmission on each of a plurality of candidate resources; and receive the downlink transmission on some or all of the plurality of candidate resources.

In some aspects, the plurality of candidate resources includes MIMO layers supported by the IAB DU for the downlink transmission based on the communication status of the IAB MT.

In some aspects, the IAB node is a full-duplex capable IAB node.

In some aspects, the at least one conditional parameter comprises two MIMO layers for the downlink transmission if the IAB MT is not receiving data from any parent node or is receiving data from a first subset of parent nodes, or the at least one conditional parameter comprises a single MIMO layer for the downlink transmission if the IAB MT is receiving data from a second subset of parent nodes.

In some aspects, the IAB node is a spatial-divisional multiplexing (SDM)-capable IAB node.

In some aspects, the at least one conditional parameter comprises two MIMO layers for the downlink transmission if the IAB MT is not transmitting data, or the at least one conditional parameter comprises one MIMO layer for the downlink transmission if the IAB MT is transmitting data.

In some aspects, the set of conditional parameters includes a starting time of the downlink transmission, a number of MIMO layers, a transmission configuration indicator (TCI) state, a spatial relation indicator, a time location, a frequency location, a time-frequency location, or a combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
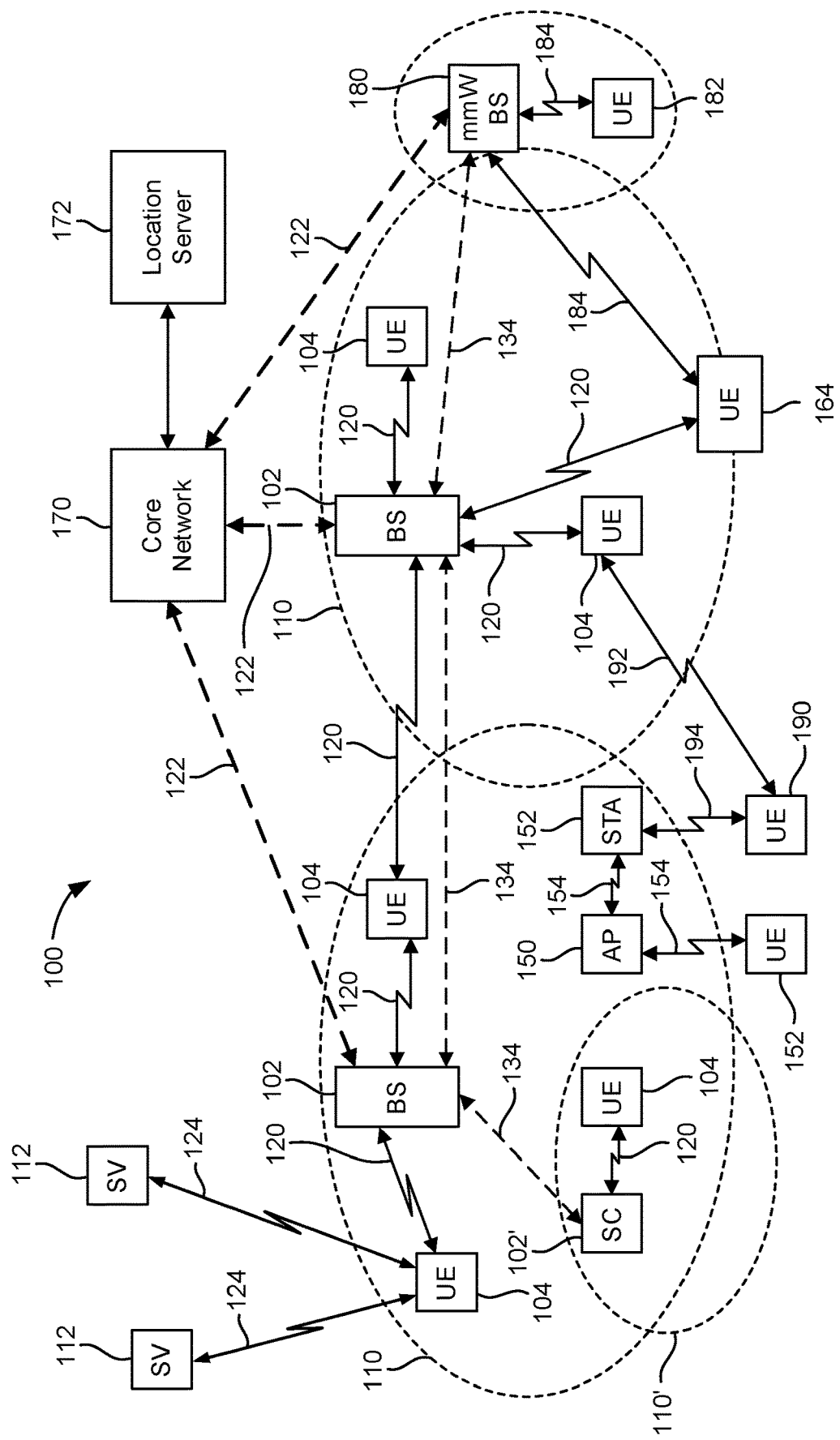
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary." and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions.

A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrow band IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHZ unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHZ, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHZ), FR2 (from 24250 to 52600 MHZ), FR3 (above 52600 MHZ), and FR4 (between FR1 and FR2). mmW frequency bands generally include the FR2. FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
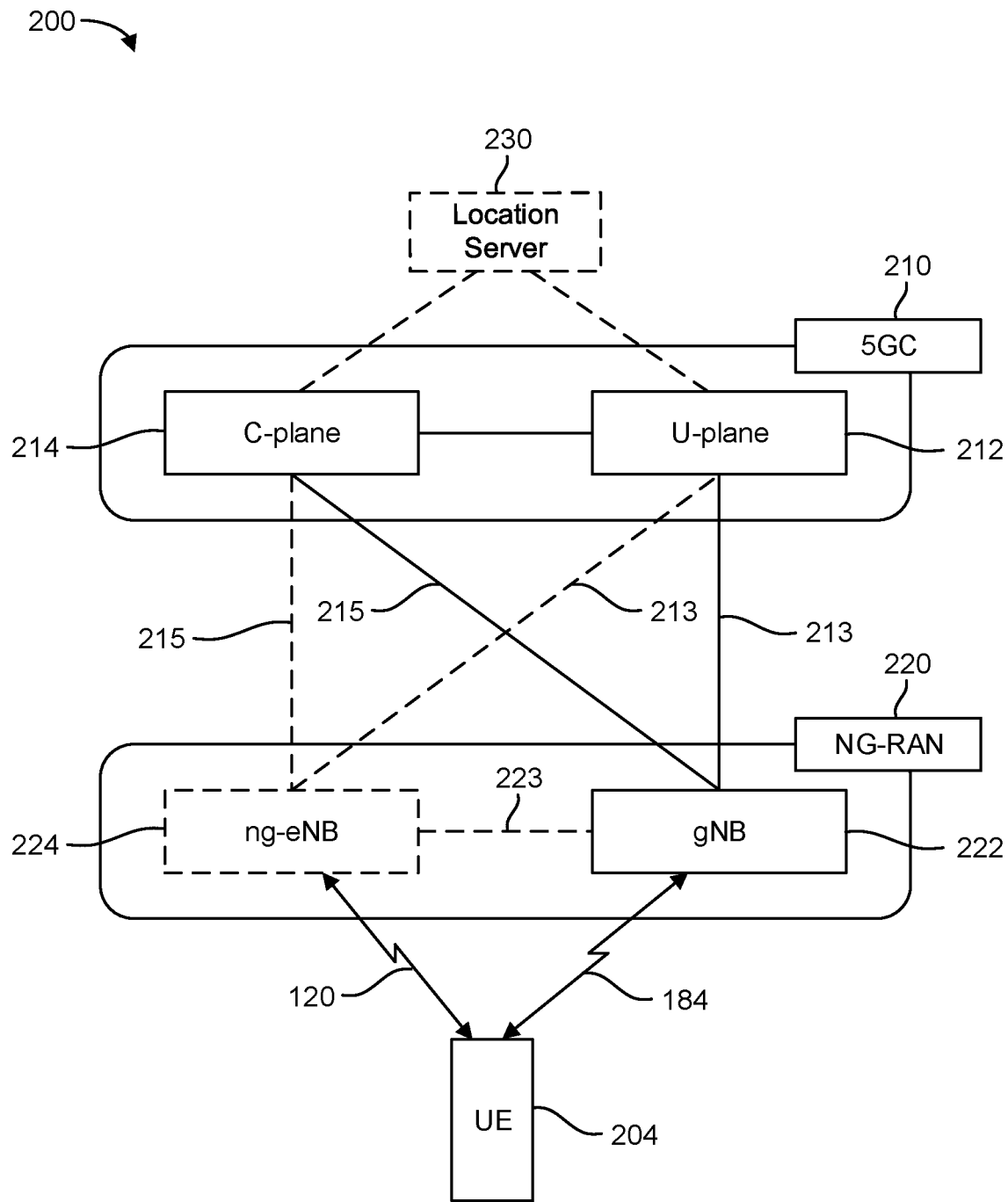
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
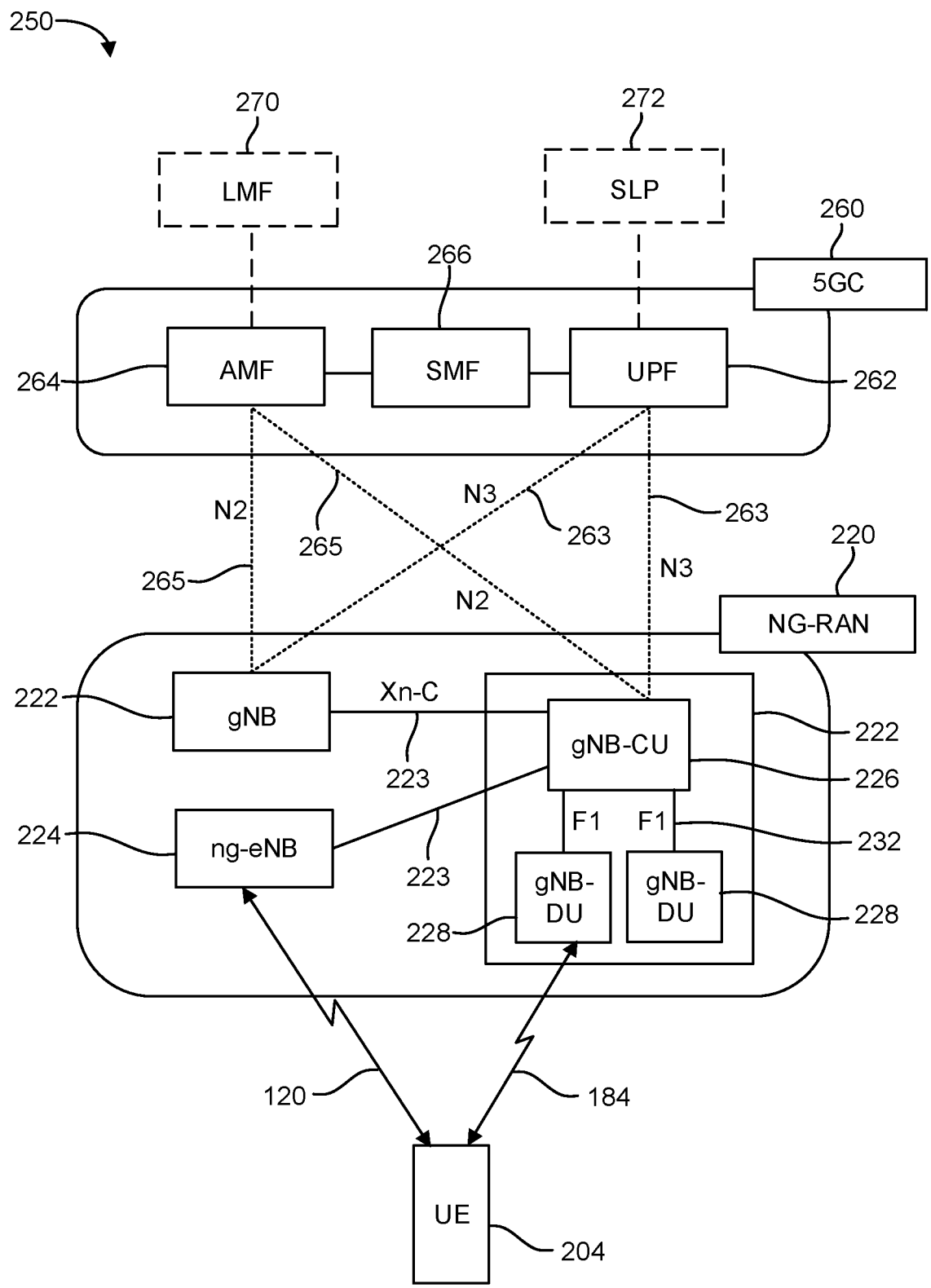

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220) and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (Qos) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
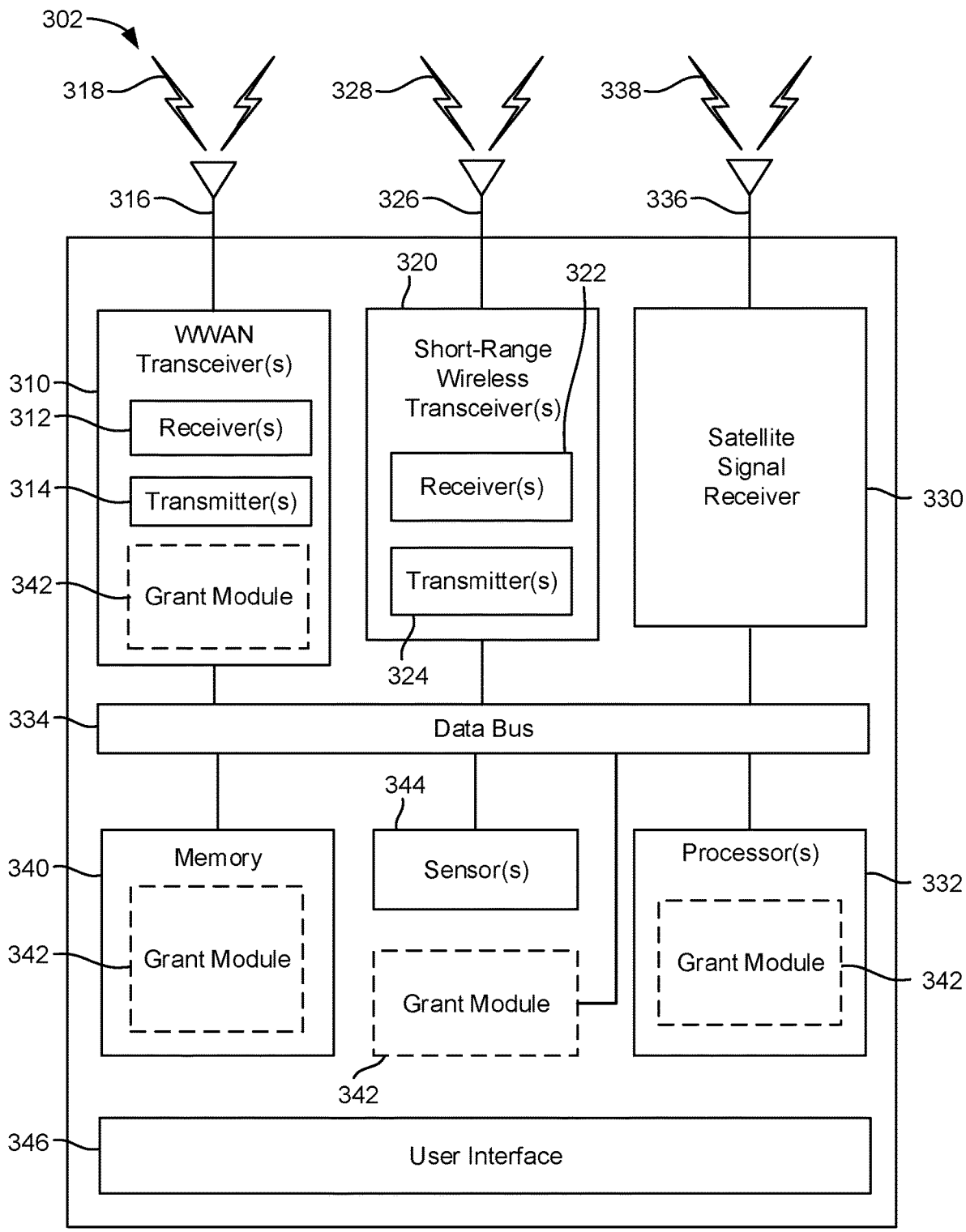
FIGS. 3A, 3B, and 3C are simplified block diagrams of several sample aspects of components that may be employed in a user equipment (UE), a base station, and a network entity, respectively, and configured to support communications as taught herein.
Figure 3B:
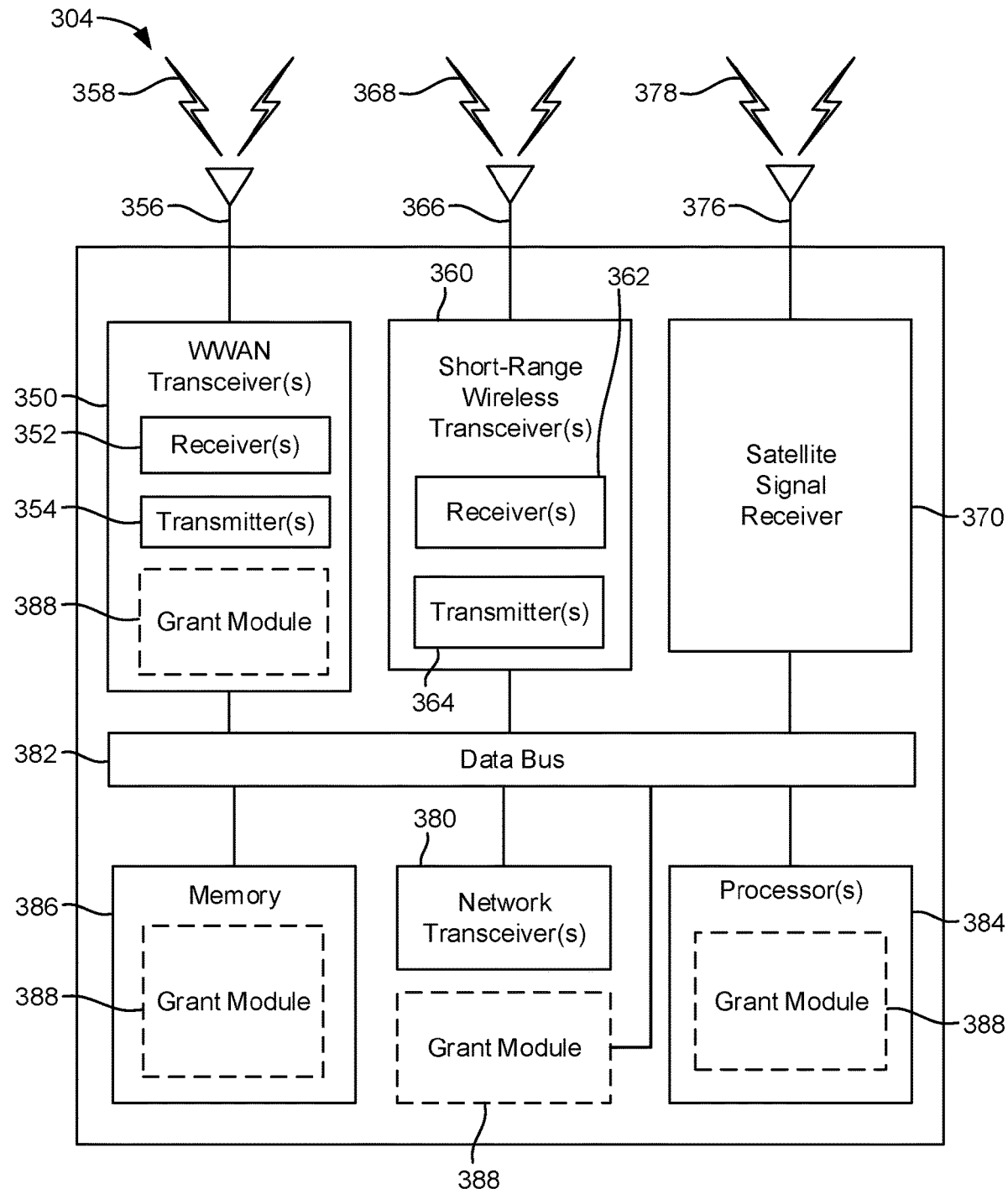
Figure 3C:
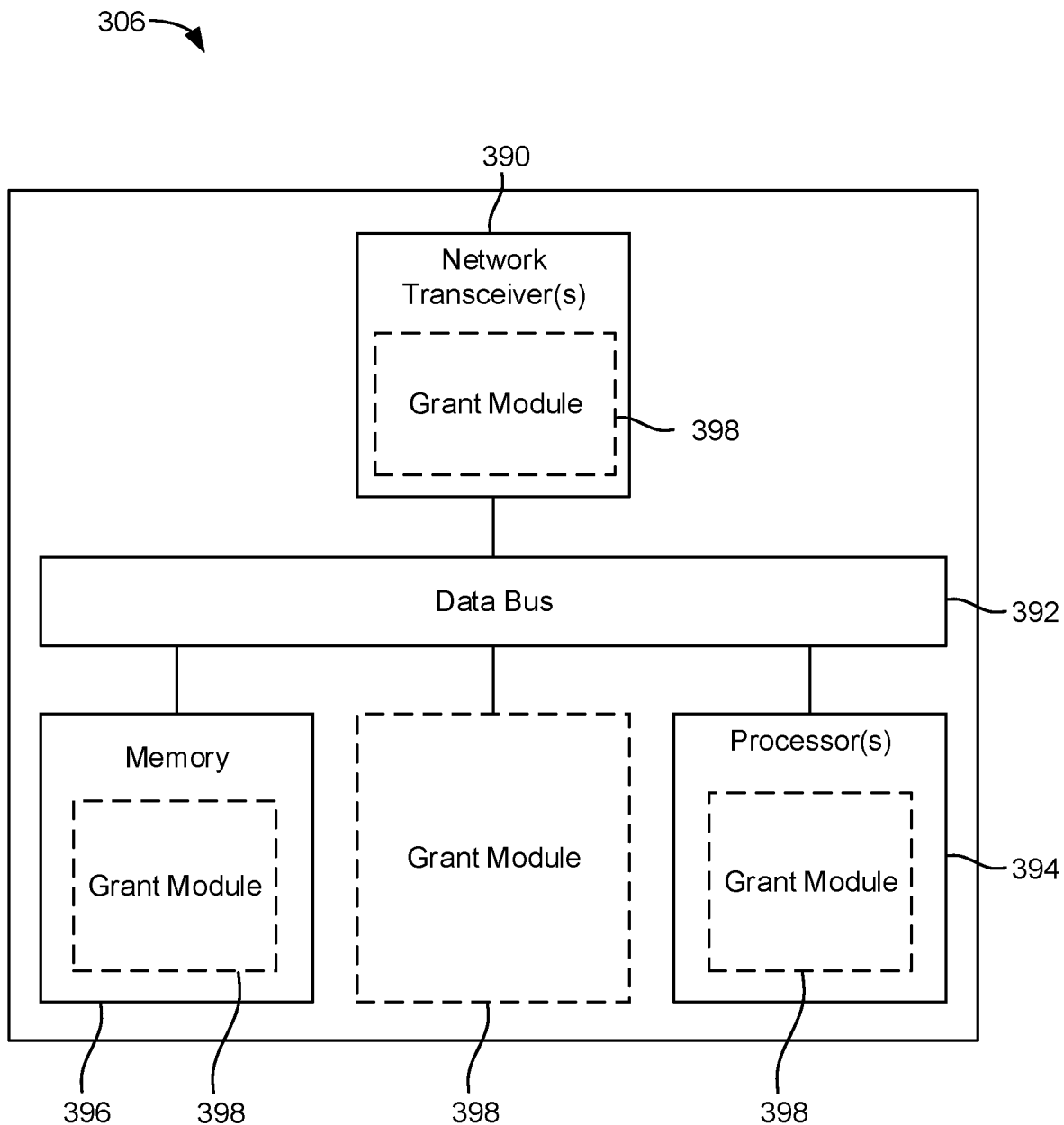

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate array's (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include Grant Module 342, 388, and 398, respectively. The Grant Module 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the Grant Module 342, 388, and 398 may be external to the processors 332, 384, and 394 (e.g., part of a modem processing system, integrated with another processing system, etc.). Alternatively, the Grant Module 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the Grant Module 342, which may be, for example, part of the one or more WWAN transceivers 310, the memory 340, the one or more processors 332, or any combination thereof, or may be a standalone component. FIG. 3B illustrates possible locations of the Grant Module 388, which may be, for example, part of the one or more WWAN transceivers 350, the memory 386, the one or more processors 384, or any combination thereof, or may be a standalone component. FIG. 3C illustrates possible locations of the Grant Module 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams.

Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the Grant Module 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Integrated access and backhaul (IAB) technologies have been developed for both LTE and NR. Due to the expected larger bandwidth and faster speeds available for NR compared to LTE (e.g., mmW spectrum), along with the native deployment of massive MIMO or multi-beam systems in NR, there is an increased opportunity to develop and deploy IAB in NR as opposed to LTE. IAB provides an alternative to wired backhaul by extending NR to support wireless backhaul. As a result, it is possible to use NR for a wireless link from a central location to distributed cell sites and between cell sites. This can simplify the deployment of, for example, small cells (e.g., small cell base station 102' in FIG. 1) and may be useful for temporary deployments for special events or emergency situations. IAB can be used in any frequency band in which NR can operate: however, it is anticipated that mmW spectrum will be the most relevant spectrum for the backhaul link due to the increased capacity. Further, the access link to the UE may operate in either the same frequency band as the backhaul link (referred to as in-band operation) or by using a separate frequency band (referred to as out-of-band operation). Link adaptation is used to select the frequency band, which reduces interference and maximizes capacity.

Figure 4A:
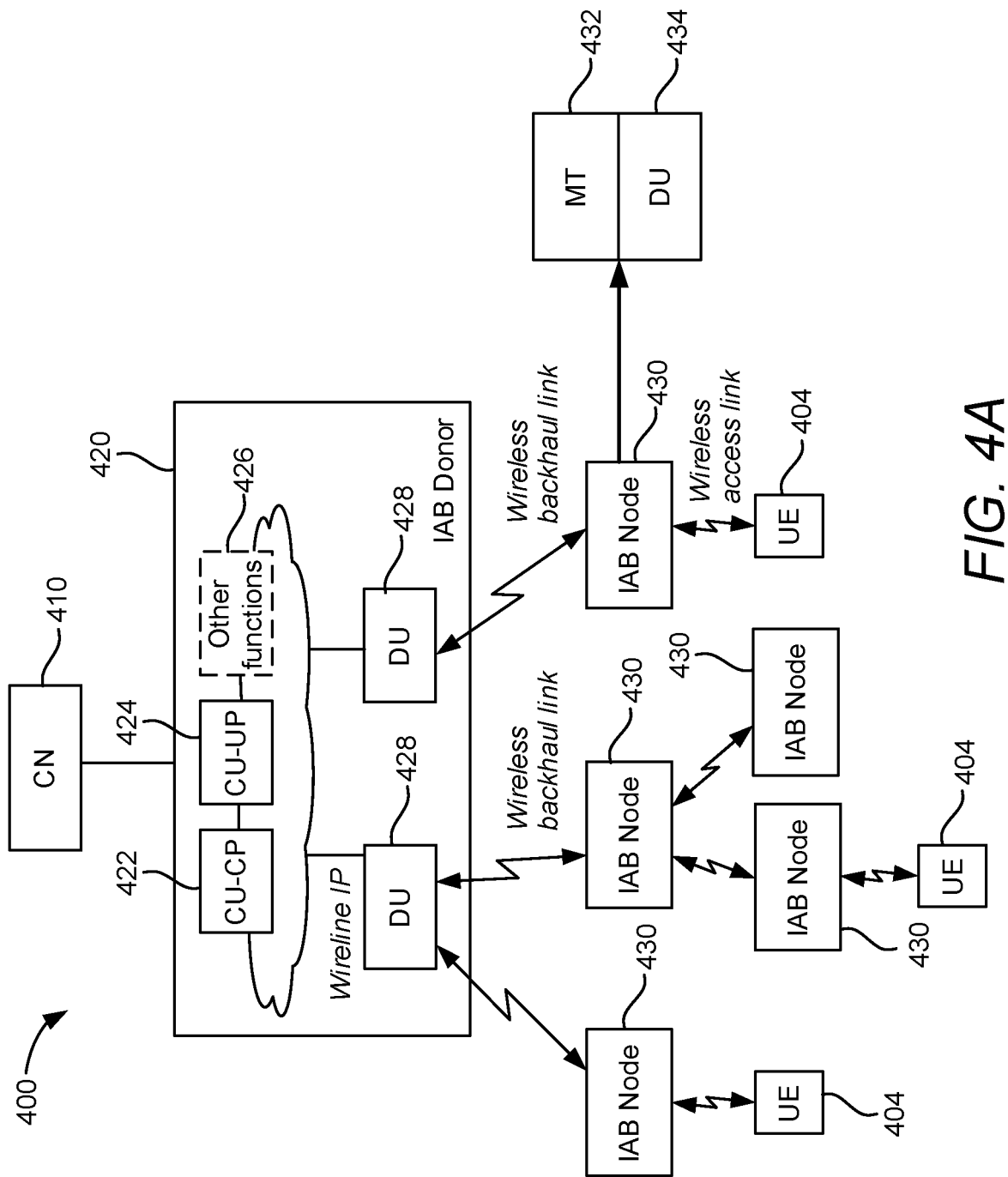
FIG. 4A illustrates an example of an integrated access and backhaul (IAB) network structure according to various aspects of the disclosure.

FIG. 4A illustrates an example of an IAB network structure 400, according to aspects of the disclosure. The IAB network structure 400 includes a core network (CN) 410 (e.g., 5GC 210 or 260) and at least one IAB donor 420. The IAB donor 420 may be an NG-RAN node (e.g., a gNB or other network entity in the NG-RAN 220) that provides a UE's interface to the core network 410 and wireless backhaul functionality to downstream IAB nodes 430. The IAB donor 420 includes a central unit control plane (CU-CP) function 422, a central unit user plane (CU-UP) function 424, and other optional functions 426. These various functions are connected to one or more distributed units (DUs) 428 (two in the example of FIG. 4A) over wireline IP links. The DUs 428 of the IAB donor 420 act as cells (i.e., the cells of a base station) to which one or more IAB nodes 430 can connect. The links between the DUs 428 and the IAB nodes 430 provide backhaul connectivity over a wireless link, and thus, as shown in FIG. 4A, are referred to as "wireless backhaul links."

An IAB node 430) includes a DU 434 that behaves like a base station towards its child nodes (e.g., UEs 404 and/or other IAB nodes 430) and a mobile terminal (MT) 432 that behaves like a UE towards its parent node (e.g., the DU 434 of another IAB node 430) or a DU 428 of the IAB donor 420). The DU 434 of an IAB node 430 creates one or more cells of its own and appears as a normal base station to UEs 404 (e.g., any of the UEs described herein) and/or the MTs 432 of other IAB nodes 430 connecting to it. The links between the DU 434 of a parent IAB node 430 and its child nodes (e.g., UEs 404 and/or the MTs 432 of other IAB nodes 430) provide network access over a wireless link, and thus, as shown in FIG. 4A, are referred to as "wireless access links." Referring to FIG. 1, the small cell base station 102' may be an IAB node 430 and the macro cell base station 102 to which it is connected may be an IAB donor 420.

Connecting an IAB node 430 to the network uses the same initial access mechanism (e.g., a random-access procedure) as a UE 404. Once connected, an IAB node 430 receives the necessary configuration from the IAB donor 420. Additional child IAB nodes 430 can connect to the network through the cell(s) created by a parent IAB node 430, thereby enabling multi-hop wireless backhauling.

Figure 4B:
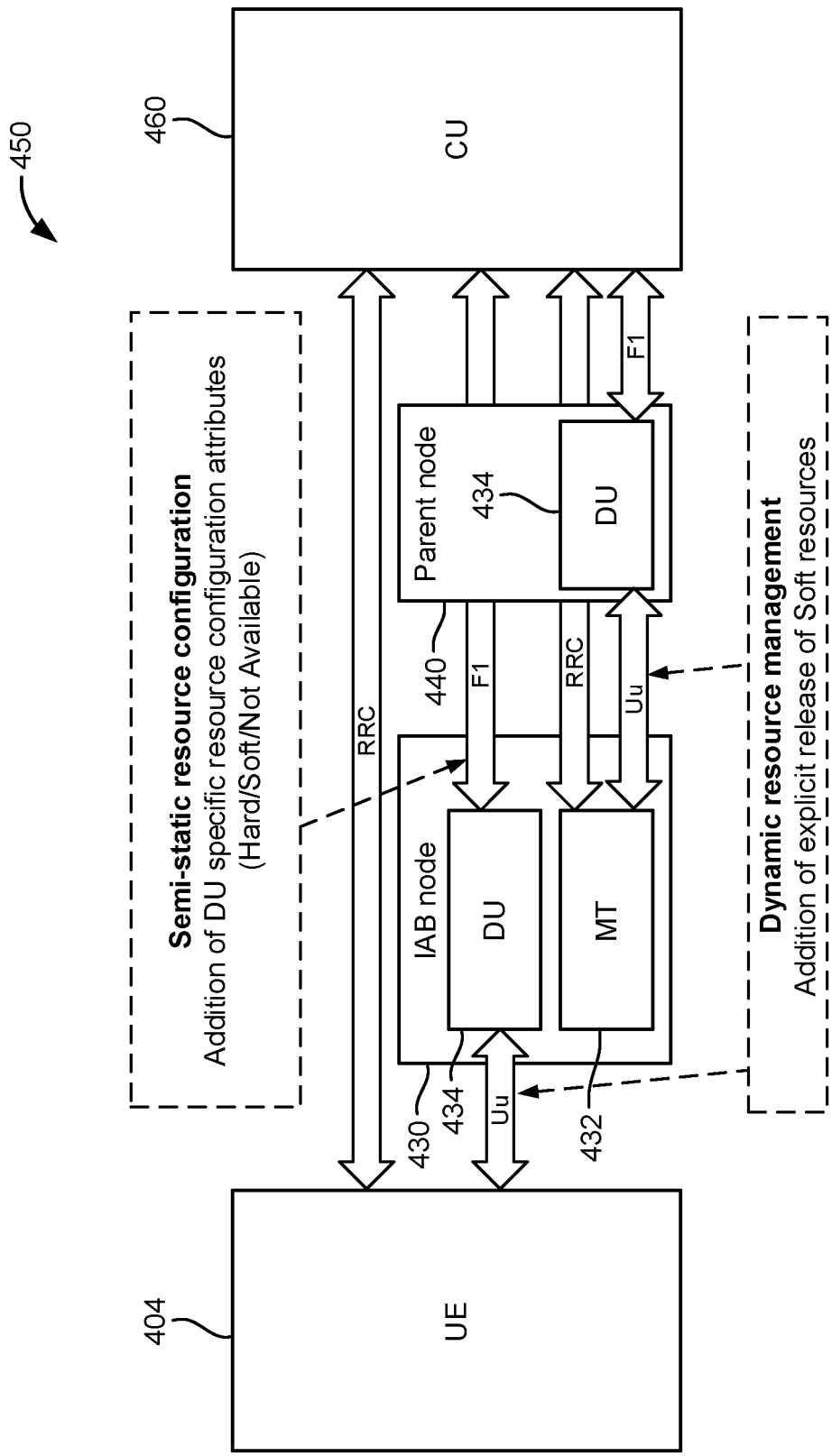
FIG. 4B is a diagram of an example IAB resource management framework, according to aspects of the disclosure.

FIG. 4B is a diagram of an example IAB resource management framework 450, according to aspects of the disclosure. FIG. 4B illustrates a CU 460, a parent node 440, an IAB node 430, and a UE 404. The CU 460 may correspond to one or both of the CU-CP 422 and CU-UP 424 in FIG. 4A. The parent node 440 may be any IAB node 430 having a child IAB node 430. The IAB node 430 includes a DU 434 and an MT 432. The parent node 440 also includes a DU 434 and an MT 432, but for simplicity, only the DU 434 is shown.

The CU 460 is a logical node that includes the base station functions of transferring user data, mobility control, radio access network sharing, positioning, session management, and the like, except for those functions allocated exclusively to the DU(s) 428 (not shown in FIG. 4B). More specifically, the CU 460 includes the radio resource control (RRC) and packet data convergence protocol (PDCP) layers of a base station, while the DU(s) 428 includes the RLC, MAC, and PHY layers of the base station. Thus, as shown in FIG. 4B, the UE 404 and the CU 460 communicate via the RRC layer, whereas the UE 404 and the DU 434 of the IAB node 930 communicate over the Uu interface (the air interface between a UE and a base station).

Because the IAB node 430 (specifically, the MT 432) acts as a UE to its parent node 440 (specifically, the DU 434), the MT 432 of the IAB node 430 also communicates with the CU 460 via the RRC layer and with the DU 434 of the parent node 440 over the Uu interface (because the link between the IAB node 430 and its parent node 440 is a wireless backhaul link). However, the respective DUs 434 of the IAB node 430 and parent node 440 communicate with the CU 460 over a wireless front-haul interface referred to as the "F1-AP" or "F1" interface. The DUs 434 obtain an IP address for F1-C(F1 control plane) and F1-U (F1 user plane) traffic from the CU 460. Any F1 traffic (F1-C and F1-U) from the DU 434 of an IAB node 430 terminates at the CU 460.

In the IAB resource management framework 450, resource and slot format definitions remain compatible with legacy UEs (e.g., non-NR UEs or older NR UEs). The focus is on the half-duplex constraint and time division multiplexing (TDM) operation between the DU 434 and the MT 432. Another difference is that additional resource attributes are defined for, and visible to, the DU 434 for semi-static resource configuration. Specifically, the additional attributes include Hard, Soft, and Not Available designations. A "Hard" designation indicates that the resource can be assumed to be used by the DU 434. A "Not Available"

designation indicates that the resource cannot be used by the DU 434 (e.g., with some exceptions for cell-specific signals). A "Soft" designation indicates that by default the resource cannot be used by the DU 434. Rather, it can be assumed to be used only if (a) the parent node 440 explicitly releases it, or (b) if the IAB node 430 can determine that it does not impact the operation of its MT 432. Thus, as shown in FIG. 4B, the dynamic resource management between the IAB node 430 and the UE 404 includes the additional functionality/signaling of explicit releases for Soft resources received by IAB node MT 423 from its parent DU 434. In some designs, Soft resources of an IAB node are dynamically controlled by its parent node (e.g., explicit indication via DCI 2_5, or implicit indication without impact to IAB MT).

In an aspect, the UE 302 and/or the base station 304 may be an IAB node (e.g., IAB node 430). In that case, the UE 302 and/or the base station 304 include network access functionality to which UEs or the MTs of other IAB nodes can connect and backhaul functionality that behaves like a UE towards its parent node (e.g., the DU of another IAB node or an IAB donor). Thus, the WWAN transceiver 310 and/or 350 and/or the short-range wireless transceiver 320 and/or 360 may provide wireless network access to one or more UEs and/or one or more MTs of other IAB nodes. Where the base station 304 is an IAB node, the WWAN transceiver 350), the short-range wireless transceiver 360, and/or the network interface(s) 380 may behave like a UE towards the base station's 302 parent node.

Note that although an IAB node comprises a DU and an MT, and both the DU and MT need their own transmit and receive capabilities, the actual hardware component(s) providing the DU and the MT functionality may be separate or may be shared. For example, the WWAN transceiver 350 may provide DU functionality and the network interface(s) 380 may provide MT functionality, or one WWAN transceiver 350 may provide DU functionality and another WWAN transceiver 350 may provide MT functionality. Alternatively, the same WWAN transceiver 350 may provide both DU and MT functionality. As such, the distinction between the DU and the MT may be a logical partition rather than a physical one.

IAB nodes may be configured with different duplex capabilities. In 3GPP Rel. 16, TDM is required between BH links (i.e., link between IAB MT and parent node) and child links (i.e., links between IAB DU and child node). In some designs, spatial division multiplexing (SDM) may be implemented in half-duplex or full-duplex.

Figure 5A:
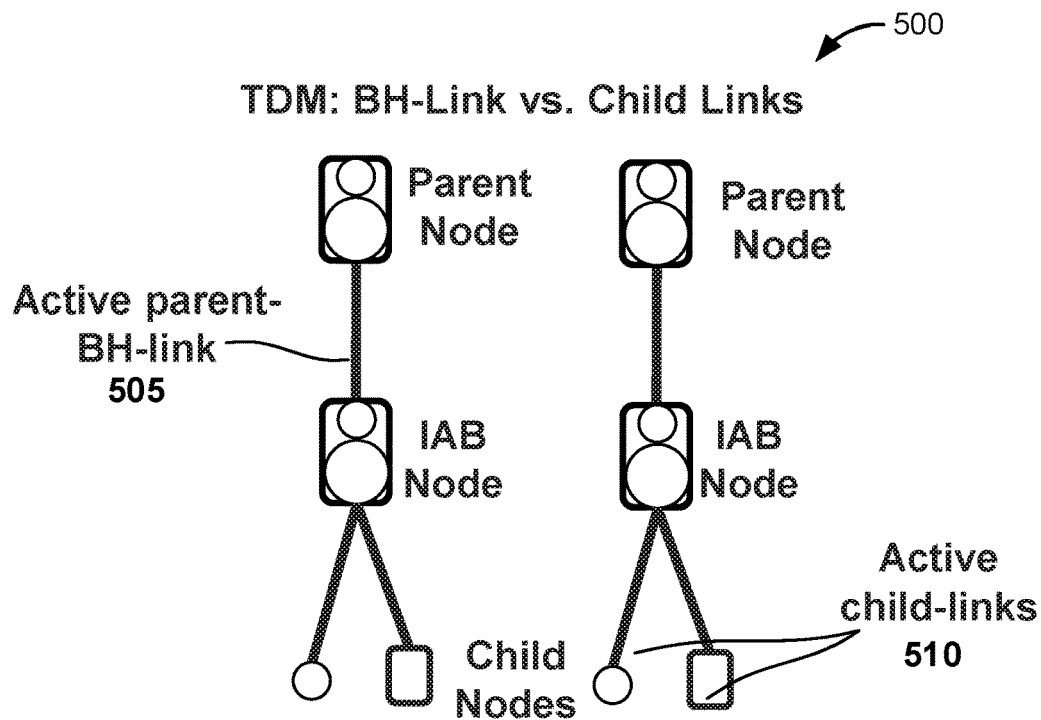
FIG. 5A illustrates a TDM scheme for an IAB network in accordance with an aspect of the disclosure.

FIG. 5A illustrates a TDM scheme 500 for an IAB network in accordance with an aspect of the disclosure. In FIG. 5A, an active parent BH-link 505 may be activated at a first time, and active child-links 510 may be activated at a second time.

Figure 5B:
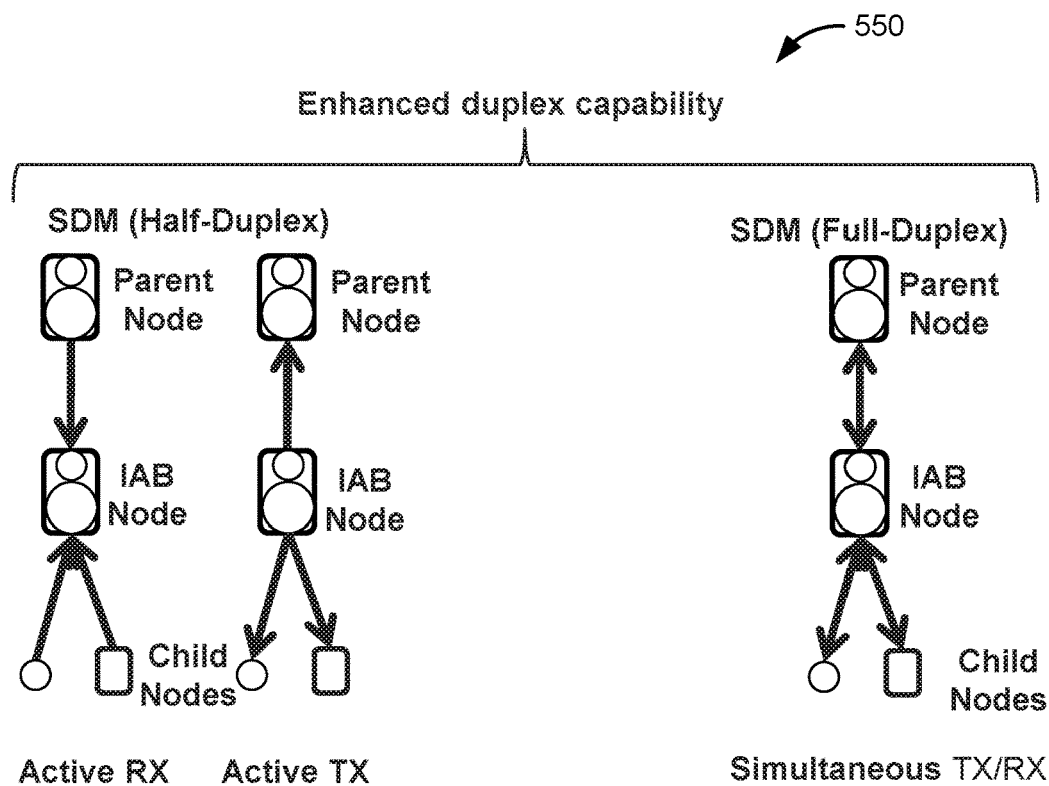
FIG. 5B illustrates SDM schemes for an IAB network in accordance with an aspect of the disclosure.

FIG. 5B illustrates SDM schemes 550 for an IAB network in accordance with an aspect of the disclosure. In FIG. 5B, in SDM half-duplex mode (left side), the IAB node may either receive in both directions or transmit in both direction. In SDM full-duplex mode (right side), the IAB node may concurrently both receive and transmit in both directions.

Figure 6A:
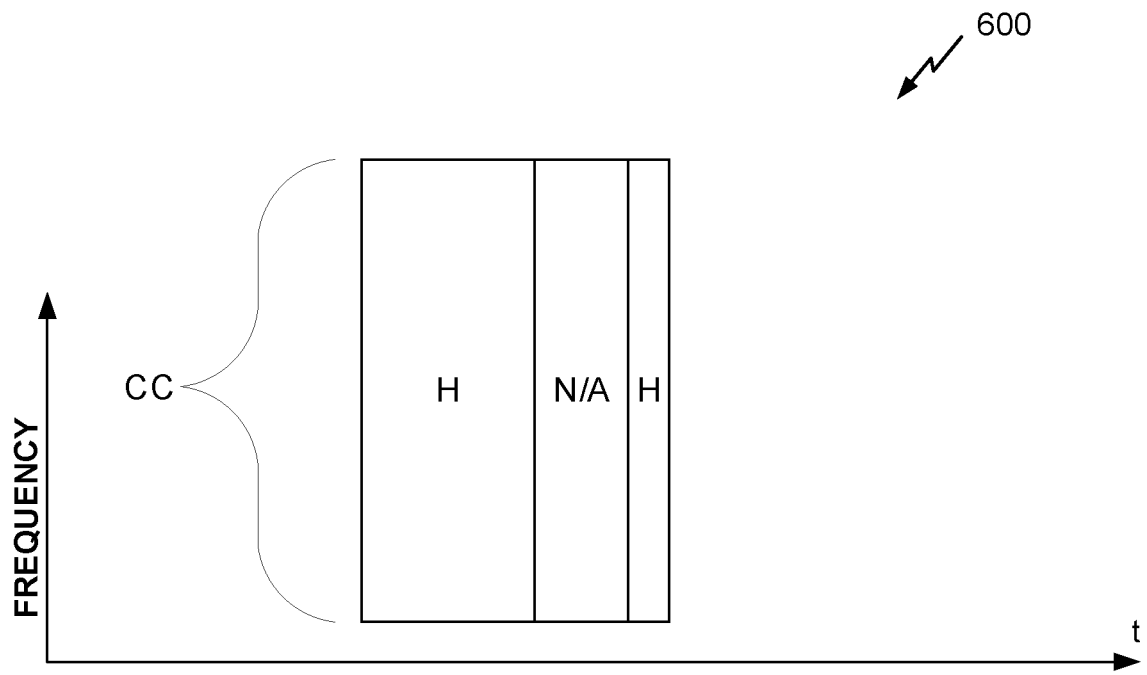
FIGS. 6A-6B illustrate semi-static resource configurations in accordance with aspects of the disclosure.
Figure 6B:
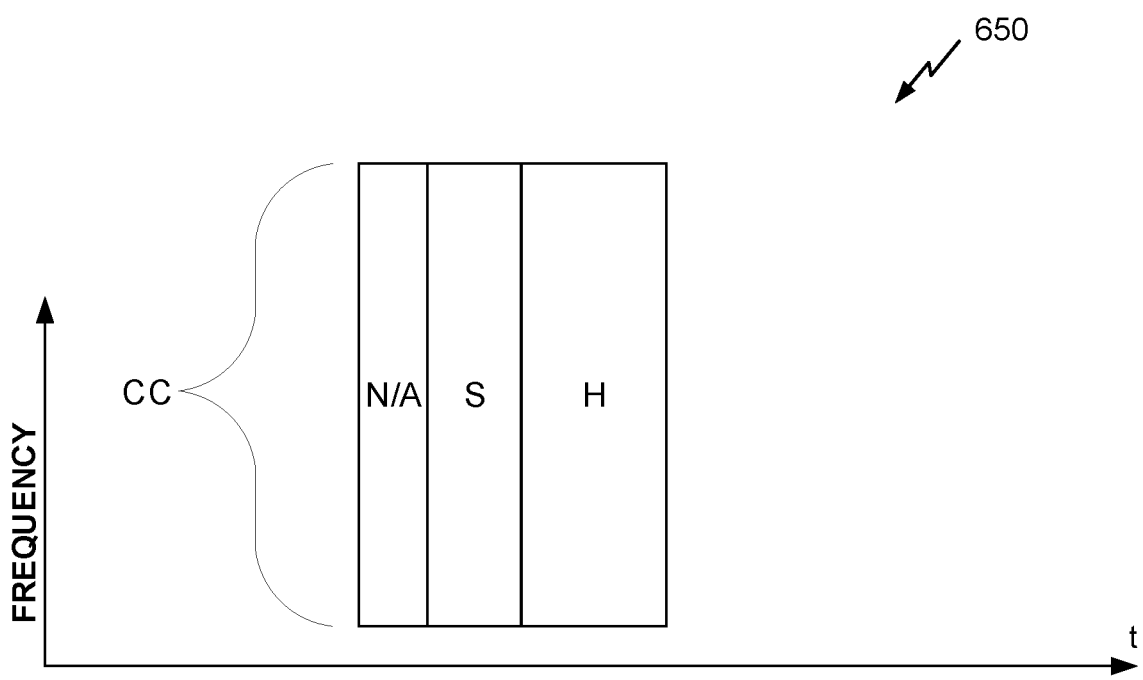

FIGS. 6A-6B illustrate semi-static resource configurations 600-650 in accordance with aspects of the disclosure. In some designs, the respective semi-static resource configurations 600-650 may be configured per DU-cell (CC). The semi-static resource configurations 600-650 depict resources configured as "Hard" (H), "Not Available" (N/A) or "Soft" (S), as described above.

Conventional resource grants in IAB networks (e.g., via H, N/A, or S resource configurations, etc.) are typically granted by a parent node to an IAB MT or from an IAB DU to child node(s), and thereafter left unchanged.

Some conventional resource grants in non-IAB networks may be made conditional in terms of timing. For example, in LTE-enhanced License Assisted Access (LAA), two-stage UL grant feature is defined, where a PUSCH grant is transmitted ahead of time without starting time information, and later triggered with a C-PDCCH is transmitted. Another example is the non-numerical K1 feature for PUCCH HARQ feedback for NRU (e.g., if DL grant indicates this non-numerical K1 as PUCCH reporting time, the UE will hold on the A/N report till the gNB provides a normal K1 in a later DL grant, e.g., the later grant can be in the next gNB COT).

However, conditional grants are not used in conventional IAB networks. Aspects of the disclosure are directed to conditional grant(s) for communications in an IAB network. In some designs, conditional grant(s) may be used to opportunistically override some or all of another grant, although this is not required in all aspects. Such aspects may provide various technical advantages, such as improved resource utilization based on dynamic conditions (e.g., reduced spectral interference from unnecessary transmission repetitions, etc.), lower latency (e.g., can apply change to previous grant in time upon triggering conditions), and so on.

Figure 7:
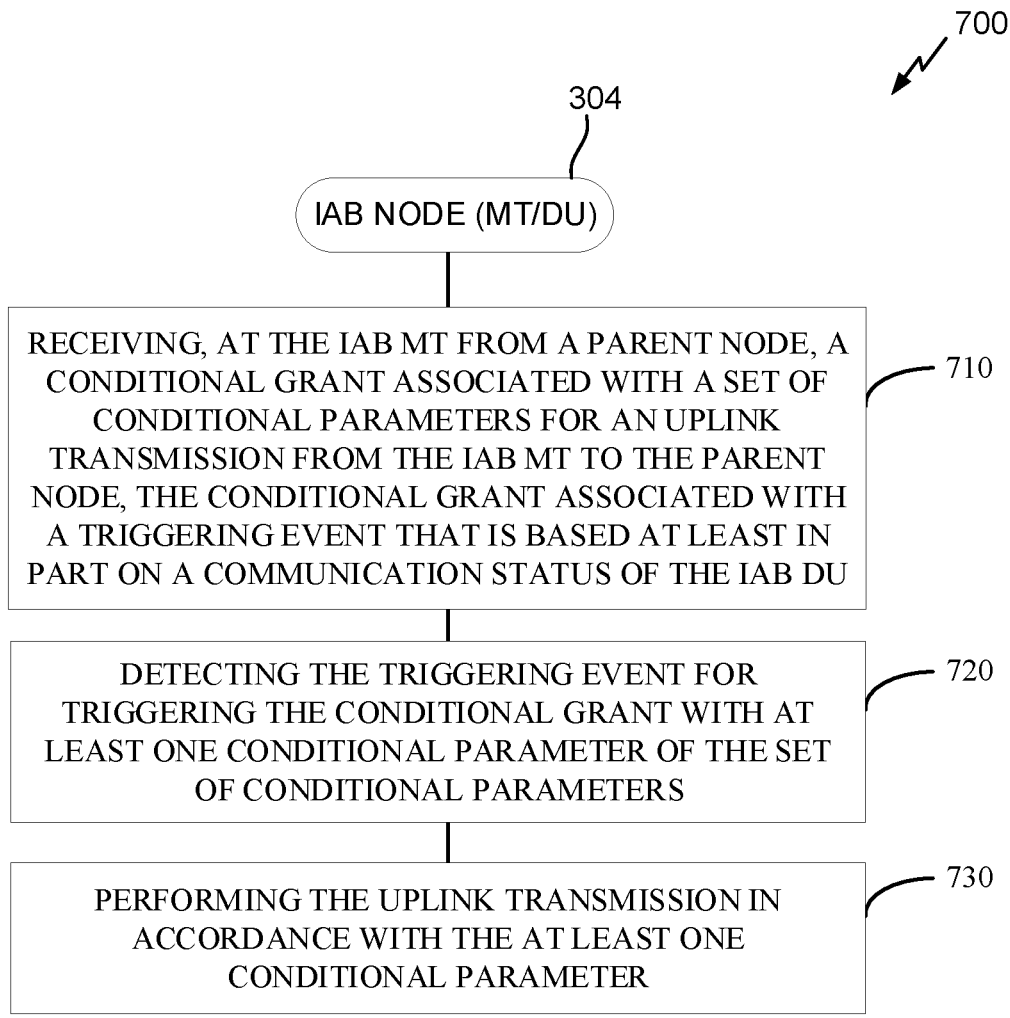
FIG. 7 illustrates an exemplary process of wireless communication, according to aspects of the disclosure.

FIG. 7 illustrates an exemplary process 700 of wireless communication, according to aspects of the disclosure. In an aspect, the process 700 may be performed by an IAB node, such as BS 304 which in some designs may be implemented as IAB node 430. The IAB node performing the process 700 includes an IAB MT and an IAB DU, as described above.

Referring to FIG. 7, at 710, the IAB node (e.g., receiver 352 or 362, etc.) receives, at the IAB MT from a parent node, a conditional grant associated with a set of conditional parameters for an uplink transmission from the IAB MT to the parent node, the conditional grant associated with a triggering event that is based at least in part on a communication status of the IAB DU. In some designs, the conditional grant may be associated with multiple triggering events for triggering different conditional parameters or different combinations of conditional parameters.

Referring to FIG. 7, at 720, the IAB node (e.g., processor(s) 384, grant module 388, etc.) detects the triggering event for triggering the conditional grant with at least one conditional parameter of the set of conditional parameters Referring to FIG. 7, at 730, the IAB node (e.g., transmitter 354 or 364) performs the uplink transmission in accordance with the at least one conditional parameter. In particular, the uplink transmission may be performed by the IAB MT and targeted to the parent node. In some designs, the parent node may correspond to the IAB DU of another IAB node, and in other designs, the parent node may correspond to a DU of an IAB donor.

Figure 8:
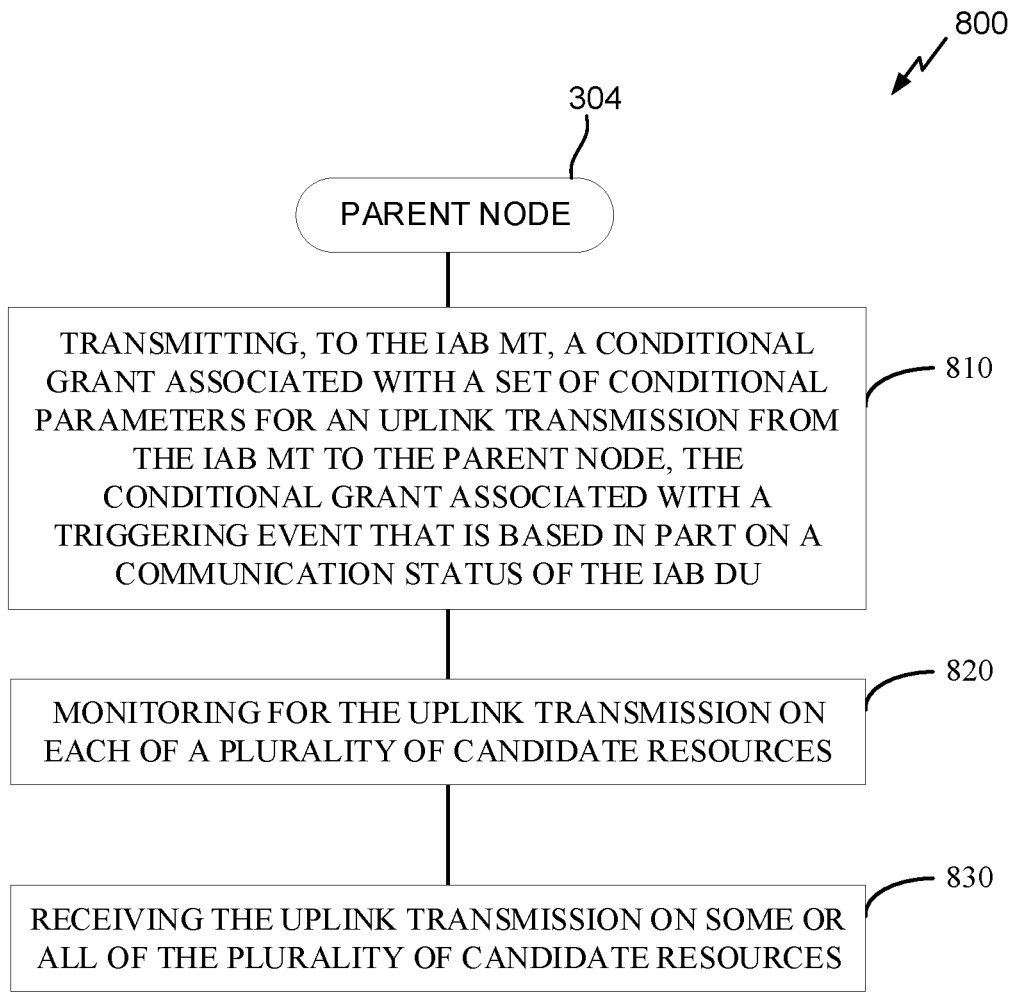
FIG. 8 illustrates an exemplary process of wireless communication, according to aspects of the disclosure.

FIG. 8 illustrates an exemplary process 800 of wireless communication, according to aspects of the disclosure. In an aspect, the process 800 may be performed by a parent node in communication with an IAB node. In some designs, the parent node may correspond to the IAB DU of another IAB node, and in other designs, the parent node may correspond to a DU of an IAB donor. In some designs, the parent node may be BS 304, which in some designs may be implemented as a parent node (e.g., IAB donor 420 or IAB node 430, which is a parent of another IAB node 430). The IAB node in communication with the parent node performing the process 800 includes an IAB MT and an IAB DU, as described above.

Referring to FIG. 8, at 810, the parent node (e.g., transmitter 354 or 364, etc.) transmits to the IAB MT, a conditional grant associated with a set of conditional parameters for an uplink transmission from the IAB MT to the parent node, the conditional grant associated with a triggering event that is based in part on a communication status of the IAB DU. In some designs, the conditional grant may be associated with multiple triggering events for triggering different conditional parameters or different combinations of conditional parameters.

Referring to FIG. 8, at 820, the parent node (e.g., receiver 352 or 362, processor(s) 384, grant module 388, etc.) monitoring for the uplink transmission on each of a plurality of candidate resources. As will be described below in more detail, the monitoring at 820 is performed as hypothesis testing since the parent node does not know with certainty the particular resource(s) that will be used for the uplink transmission.

Referring to FIG. 8, at 830, the parent node (e.g., receiver 352 or 362) receives the uplink transmission on some or all of the plurality of candidate resources.

Referring to FIGS. 7-8, as noted above, the set of conditional parameters may include a plurality of candidate resources (e.g., MIMO layers) associated with the uplink transmission. In this case, the at least one conditional parameter includes some or all of the plurality of candidate resources based at least in part on the communication status of the IAB DU. While certain examples of candidate resources are described above with respect to MIMO layers, other candidate resources may be included in other aspects of the disclosure.

Referring to FIGS. 7-8, in some designs, the set of conditional parameters may include a starting time of the uplink transmission, a number of MIMO layers, a transmission configuration indicator (TCI) state, a spatial relation indicator, a time location, a frequency location, a time-frequency location, or a combination thereof.

Figure 9:
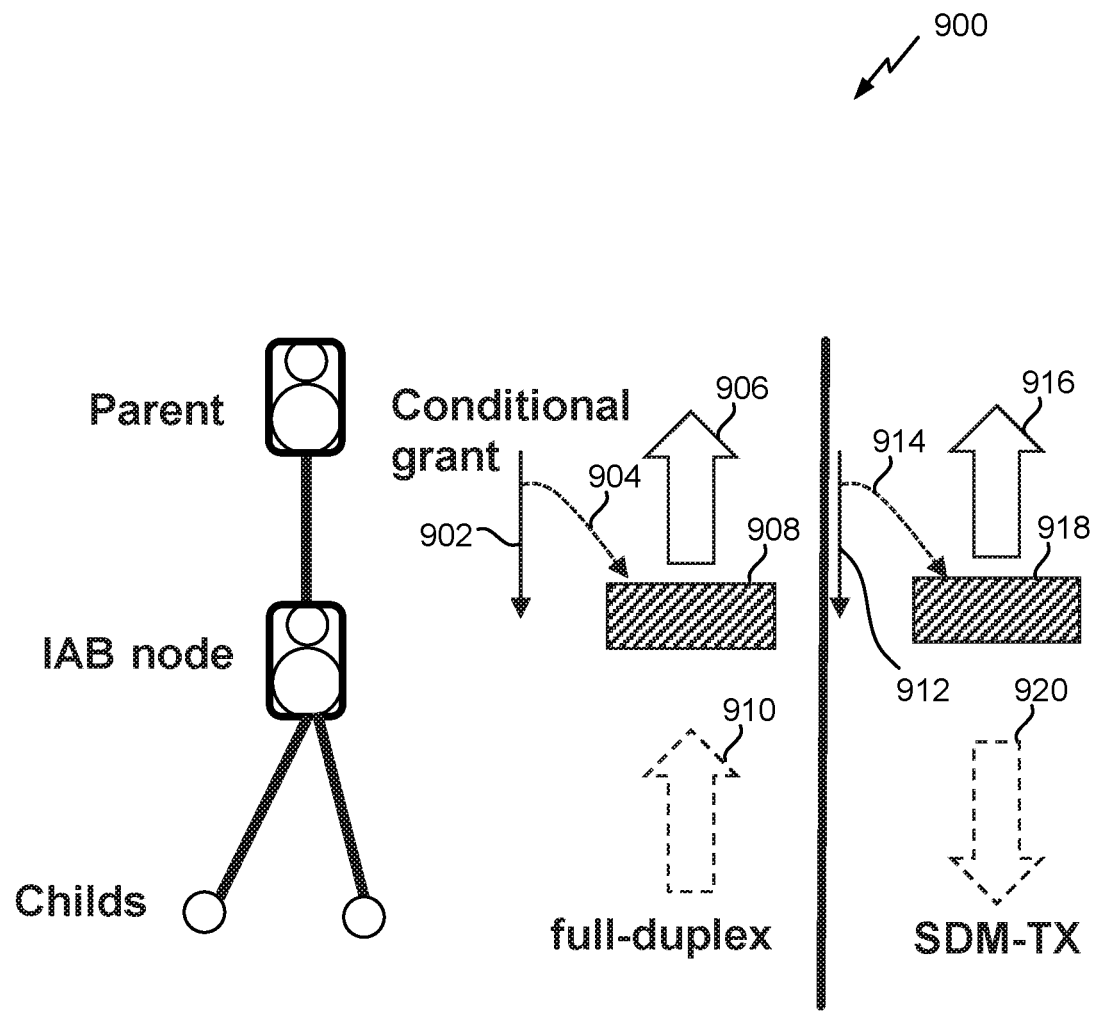
FIG. 9 illustrates example implementations of the processes of FIGS. 7-8 in accordance with aspects of the disclosure.

FIG. 9 illustrates example implementations 900 of the processes 700-800 of FIGS. 7-8 in accordance with aspects of the disclosure.

Referring to FIG. 9, in a first example implementation of the processes 700-800 of FIGS. 7-8, assume that the IAB node is a full-duplex capable IAB node. At 902, the parent node transmits a conditional grant to an IAB MT of the full-duplex IAB node. At 904, the parent node optionally transmits conditional grant(s) to IAB MT(s) of other IAB node(s).

The full-duplex IAB MT performs an uplink transmission 906 to the parent node on resource(s) 908. In this case, the conditional parameter(s) used for the uplink transmission 906 are based in part on a receive status of possible child node reception(s) 910 received at the IAB DU of the full-duplex IAB node. The presence or absence of the possible child node reception(s) 910 is not known when the conditional grant 902 is issued.

Referring to FIG. 9, in a second example implementation of the processes 700-800 of FIGS. 7-8, assume that the IAB node is an SDM-capable (e.g., half-duplex) IAB node. At 912, the parent node transmits a conditional grant to an IAB MT of the SDM-capable IAB node. At 914, the parent node optionally transmits conditional grant(s) to IAB MT(s) of other IAB node(s). The IAB MT performs an uplink transmission 916 to the parent node on resource(s) 918. In this case, the conditional parameter(s) used for the uplink transmission 916 are based in part on a transmit status of possible child node transmission(s) 920 from the IAB DU of the IAB node. The presence or absence of the possible child node transmission(s) 920 is not known when the conditional grant 912 is issued.

Referring to FIGS. 7-8, in some designs, the plurality of candidate resources includes MIMO layers supported by the IAB MT for the uplink transmission based on the communication status of the IAB DU. In some designs, where the IAB node is a full-duplex capable IAB node (e.g., as in 902-910 of FIG. 9), the at least one conditional parameter may include two MIMO layers for the uplink transmission if the IAB DU is not receiving data from any child node or is receiving data from a first subset of child nodes (e.g., below some threshold such that the uplink transmission can use both MIMO layers), or the at least one conditional parameter may include a single MIMO layer for the uplink transmission if the IAB DU is receiving data from a second subset of child nodes (e.g., above some threshold such that the uplink transmission cannot use both MIMO layers).

In other designs, where the IAB node is a spatial-divisional multiplexing (SDM)-capable IAB node such as a half-duplex SDM-capable node (e.g., as in 912-920 of FIG. 9), the at least one conditional parameter may include two MIMO layers for the uplink transmission if the IAB DU is not transmitting data to any child node, or the at least one conditional parameter comprises one MIMO layer for the uplink transmission if the IAB DU is transmitting data to any child node. For example, the SDM-capable IAB node may be limited in some manner (e.g., limited number of panels), such that two (or more) MIMO layers cannot be used for uplink transmission while a downlink transmission is being performed.

Referring to FIGS. 7-8, at a high-level, a number of MIMO layers supported by the IAB MT for uplink transmission can depend on the IAB DU scheduling status, where this scheduling status is only determined after the conditional grant is issued.

Referring to FIGS. 7-8, in some designs, a conditional grant for IAB node MT UL TX may include a list of candidate values for a conditional parameter, e.g., number of MIMO layers being 1 or 2, is received by IAB MT from parent node, and IAB MT may select one value out of candidate values for the conditional parameter for UL TX based on the scheduling status of co-located IAB DU. Parent node may do hypothesis testing when receiving the UL TX from IAB MT based on candidate values for uncertain parameters. In general, in multi-hop network (e.g., IAB), overlapping (time/frequency) resources may have been allocated to adjacent link (parent and child). A conditional grant from the parent-node is one way of local coordination to share resources, while still giving some choices/priority to the child-node.

Figure 10:
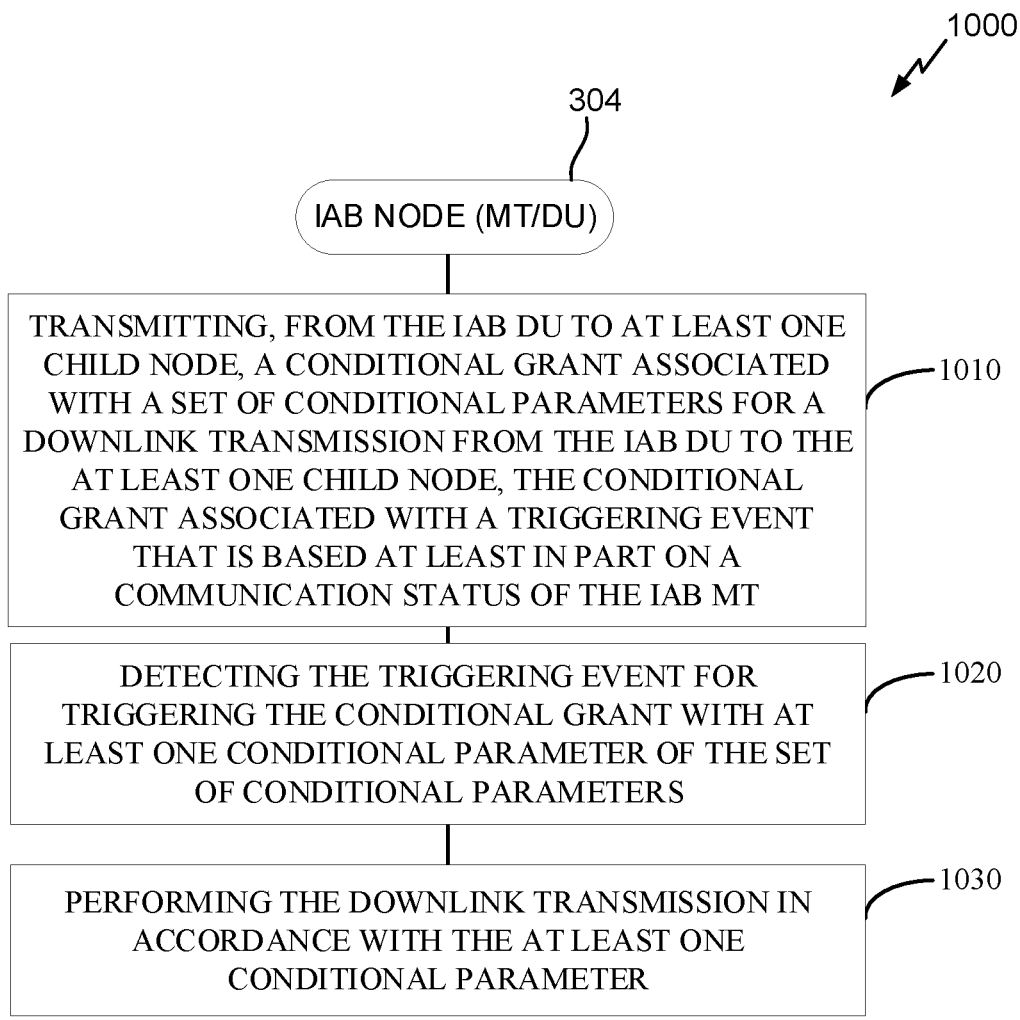
FIG. 10 illustrates an exemplary process of wireless communication, according to aspects of the disclosure.

FIG. 10 illustrates an exemplary process 1000 of wireless communication, according to aspects of the disclosure. In an aspect, the process 1000 may be performed by an IAB node, such as BS 304 which in some designs may be implemented as IAB node 430. The IAB node performing the process 700 includes an IAB MT and an IAB DU, as described above.

Referring to FIG. 10, at 1010, the IAB node (e.g., transmitter 354 or 364, etc.) transmits, from the IAB DU to at least one child node, a conditional grant associated with a set of conditional parameters for a downlink transmission from the IAB DU to the at least one child node, the conditional grant associated with a triggering event that is based at least in part on a communication status of the IAB MT. In some designs, the conditional grant may be associated with multiple triggering events for triggering different conditional parameters or different combinations of conditional parameters.

Referring to FIG. 10, at 1020, the IAB node (e.g., processor(s) 384, grant module 388, etc.) detects the triggering event for triggering the conditional grant with at least one conditional parameter of the set of conditional parameters.

Referring to FIG. 10, at 1030, the IAB node (e.g., transmitter 354 or 364, etc.). In particular, the downlink transmission may be performed by the IAB DU and targeted to the at least one child node. In some designs, the at least one child node may correspond to IAB MT(s) of other IAB node(s), and in other designs, the at least one child node may correspond to UE(s).

Figure 11:
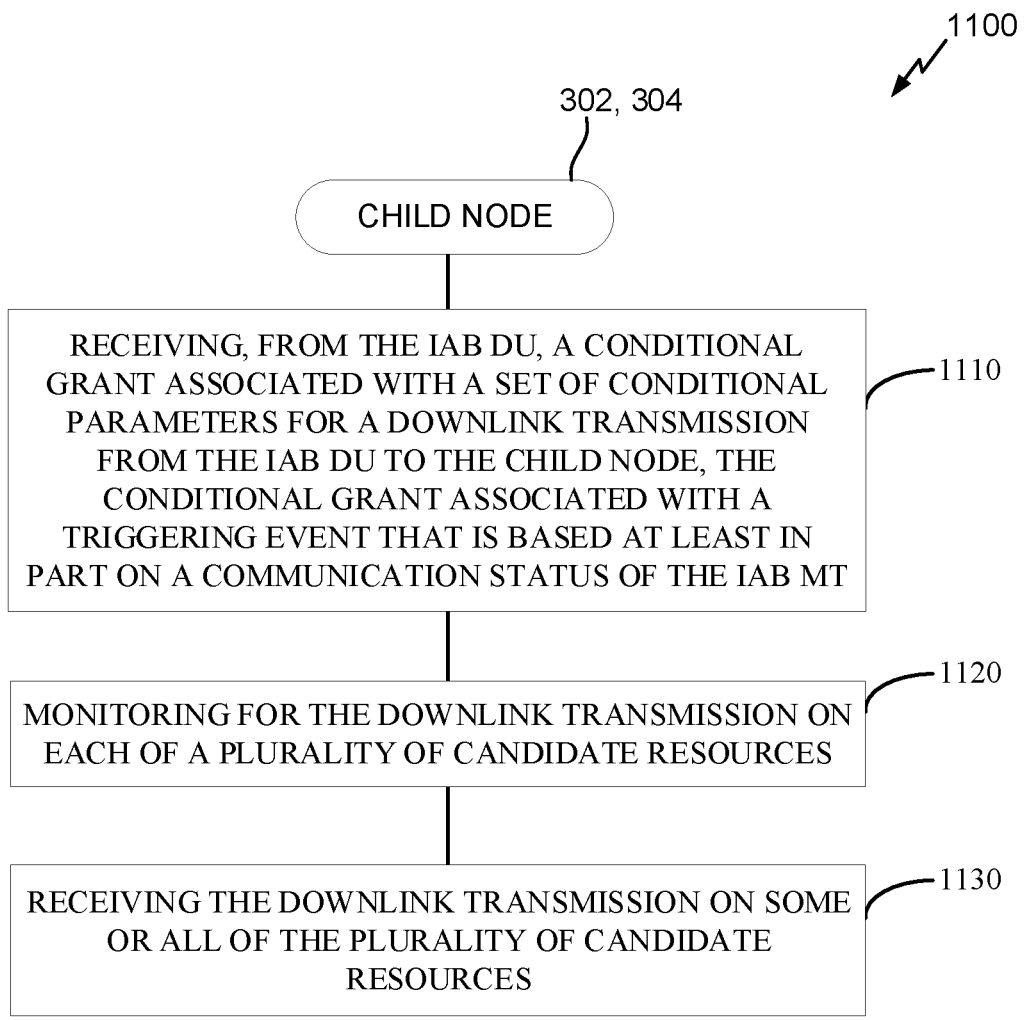
FIG. 11 illustrates an exemplary process of wireless communication, according to aspects of the disclosure.

FIG. 11 illustrates an exemplary process 1100 of wireless communication, according to aspects of the disclosure. In an aspect, the process 1100 may be performed by a child node in communication with an IAB node. In some designs, the child node may correspond to the IAB MT of another IAB node, and in other designs, the child node may correspond to a UE. Hence, the child node may correspond to a UE such as UE 302 or an IAB node that may be implemented as BS 304 or IAB node 430. The IAB node in communication with the child node performing the process 1100 includes an IAB MT and an IAB DU, as described above.

Referring to FIG. 11, at 1110, the child node (e.g., receiver 312 or 322 or 352 or 362, etc.) receives, from the IAB DU, a conditional grant associated with a set of conditional parameters for a downlink transmission from the IAB DU to the child node, the conditional grant associated with a triggering event that is based at least in part on a communication status of the IAB MT. In some designs, the conditional grant may be associated with multiple triggering events for triggering different conditional parameters or different combinations of conditional parameters.

Referring to FIG. 11, at 1120, the child node (e.g., receiver 312 or 322 or 352 or 362, processor(s) 332 or 384, grant module 332 or 388, etc.) monitors for the downlink transmission on each of a plurality of candidate resources. As will be described below in more detail, the monitoring at 1120 is performed as hypothesis testing since the child node does not know with certainty the particular resource(s) that will be used for the down transmission.

Referring to FIG. 11, at 1130, the child node (e.g., receiver 312 or 322 or 352 or 362, etc.) receives the downlink transmission on some or all of the plurality of candidate resources.

Referring to FIGS. 10-11, in some designs as noted above, the set of conditional parameters comprises a plurality of candidate resources (e.g., MIMO layers) associated with the downlink transmission. In this case, the at least one conditional parameter includes some or all of the plurality of candidate resources based at least in part on the communication status of the IAB MT. While certain examples of candidate resources are described above with respect to MIMO layers, other candidate resources may be included in other aspects of the disclosure.

Referring to FIGS. 10-11, in some designs, the set of conditional parameters may include a starting time of the downlink transmission, a number of MIMO layers, a transmission configuration indicator (TCI) state, a spatial relation indicator, a time location, a frequency location, a time-frequency location, or a combination thereof.

Figure 12:
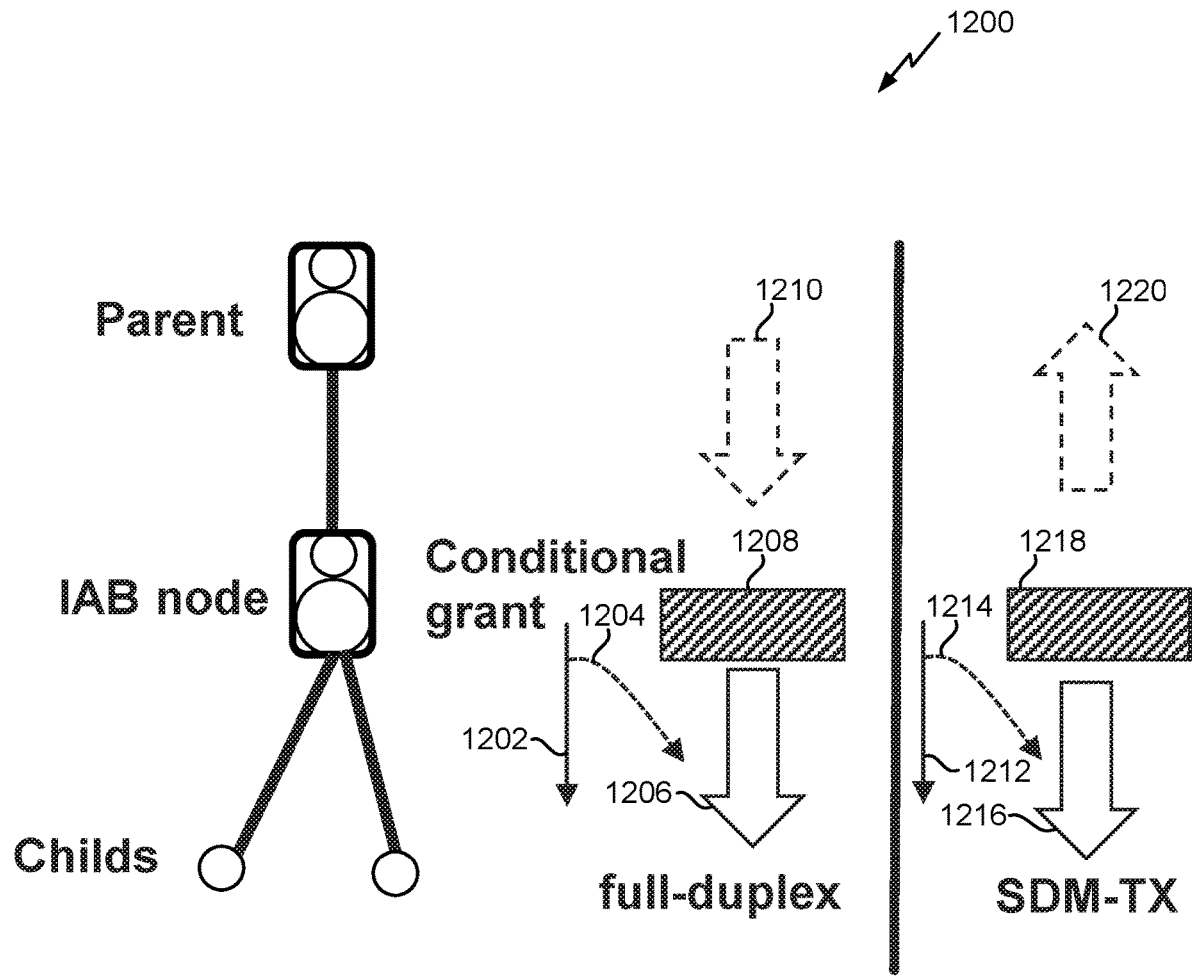
FIG. 12 illustrates example implementations of the processes of FIGS. 10-11 in accordance with aspects of the disclosure.

FIG. 12 illustrates example implementations 1200 of the processes 1000-1100 of FIGS. 10-11 in accordance with aspects of the disclosure.

Referring to FIG. 12, in a first example implementation of the processes 1000-1100 of FIGS. 10-11, assume that the IAB node is a full-duplex capable IAB node. At 1202, the IAB DU transmits a conditional grant to a child node of the full-duplex IAB node. At 1204, the IAB DU optionally transmits conditional grant(s) to other child node(s). The IAB DU performs a downlink transmission 1206 to the child node on resource(s) 1208. In this case, the conditional parameter(s) used for the downlink transmission 1206 are based in part on a receive status of possible parent node reception(s) 1210 received at the IAB MT of the full-duplex IAB node. The presence or absence of the possible parent node reception(s) 1210 is not known when the conditional grant 1202 is issued.

Referring to FIG. 12, in a second example implementation of the processes 1000-1100 of FIGS. 10-11, assume that the IAB node is an SDM-capable (e.g., half-duplex) IAB node. At 1212, the IAB DU transmits a conditional grant to a child node of the SDM-capable IAB node. At 1214, the child node optionally transmits conditional grant(s) to other child node(s). The IAB DU performs a downlink transmission 1216 to the child node on resource(s) 1218. In this case, the conditional parameter(s) used for the downlink transmission 1216 are based in part on a transmit status of possible parent node transmission(s) 1220 to the IAB MT of the parent node. The presence or absence of the possible parent node transmission(s) 1220 is not known when the conditional grant 1212 is issued.

Referring to FIGS. 10-11, in some designs, the plurality of candidate resources includes MIMO layers supported by the IAB DU for the downlink transmission based on the communication status of the IAB MT. In some designs, the IAB node is a full-duplex capable IAB node (e.g., as in 1202-1210 of FIG. 12), and the at least one conditional parameter comprises two MIMO layers for the downlink transmission if the IAB MT is not receiving data from any parent node or is receiving data from a first subset of parent nodes, or the at least one conditional parameter comprises a single MIMO layer for the downlink transmission if the IAB MT is receiving data from a second subset of parent nodes.

In other designs, where the IAB node is a spatial-divisional multiplexing (SDM)-capable IAB node such as a half-duplex SDM-capable node (e.g., as in 1212-1220 of FIG. 12), the at least one conditional parameter comprises two MIMO layers for the downlink transmission if the IAB MT is not transmitting data, or the at least one conditional parameter comprises one MIMO layer for the downlink transmission if the IAB MT is transmitting data.

Referring to FIGS. 10-11, at a high-level, a number of MIMO layers supported by the IAB DU for downlink transmission can depend on the IAB MT scheduling status, where this scheduling status is only determined after the conditional grant is issued.

Referring to FIGS. 11-12, in some designs, a conditional grant for IAB DU DL TX may include a list of candidate values for a conditional parameter, e.g., number of MIMO layers being 1 or 2, is transmitted by IAB DU to child node(s), and IAB DU may select one value out of candidate values for the conditional parameter for DL TX based on the scheduling status of co-located IAB MT. Child node may do hypothesis testing when receiving the DL TX from IAB DU based on candidate values for uncertain parameters. In general, in multi-hop network (e.g., IAB), overlapping (time/frequency) resources may have been allocated to adjacent link (parent and child). A conditional grant from the IAB DU is one way of local coordination to share resources, while still giving some choices/priority to the parent node.

Referring to FIGS. 7-12, in some designs, the at least one conditional parameter may include one or more of a starting time of the UL/DL transmission, a number of layers (e.g., frequency or MIMO layers), a TCI state, a spatial relation indicator, RV, time and/or frequency location, etc. In some designs, the conditional grant may be a dynamic, semi-persistent, or periodic grant. In some designs, the conditional grant can be a separate grant or carried within the associated grant via extended field(s). In some designs, the conditional grant and the associated grant can be associated with dedicated RNTI, search space etc. In some designs, multiple conditional grants may be issued, with the same or different triggering criteria. In some designs, the conditional grant may function to override or supersede at least some part of another grant. In some designs, the triggering criteria (or triggering event) for particular conditional parameter(s) may be pre-defined, or network configured (e.g., via RRC or MAC-CE) or indicated by the conditional grant.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating an integrated access and backhaul (IAB) node comprising an IAB mobile terminal (MT) and an IAB distributed unit (DU), comprising: receiving, at the IAB MT from a parent node, a conditional grant associated with a set of conditional parameters for an uplink transmission from the IAB MT to the parent node, the conditional grant associated with a triggering event that is based at least in part on a communication status of the IAB DU: detecting the triggering event for triggering the conditional grant with at least one conditional parameter of the set of conditional parameters; and performing the uplink transmission in accordance with the at least one conditional parameter.

Clause 2. The method of clause 1, wherein the set of conditional parameters comprises a plurality of candidate resources associated with the uplink transmission, and wherein the at least one conditional parameter includes some or all of the plurality of candidate resources based at least in part on the communication status of the IAB DU.

Clause 3. The method of clause 2, wherein the plurality of candidate resources includes MIMO layers supported by the IAB MT for the uplink transmission based on the communication status of the IAB DU.

Clause 4. The method of clause 3, wherein the IAB node is a full-duplex capable IAB node.

Clause 5. The method of clause 4, wherein the at least one conditional parameter comprises two MIMO layers for the uplink transmission if the IAB DU is not receiving data from any child node or is receiving data from a first subset of child nodes, or wherein the at least one conditional parameter comprises a single MIMO layer for the uplink transmission if the IAB DU is receiving data from a second subset of child nodes.

Clause 6. The method of any of clauses 3 to 5, wherein the IAB node is a spatial-divisional multiplexing (SDM)-capable IAB node.

Clause 7. The method of any of clauses 5 to 6, wherein the at least one conditional parameter comprises two MIMO layers for the uplink transmission if the IAB DU is not transmitting data to any child node, or wherein the at least one conditional parameter comprises one MIMO layer for the uplink transmission if the IAB DU is transmitting data to any child node.

Clause 8. The method of any of clauses 2 to 7, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

Clause 9. A method of operating a parent node in communication with an integrated access and backhaul (IAB) network node that comprises an IAB mobile terminal (MT) and an IAB distributed unit (DU), comprising: transmitting, to the IAB MT, a conditional grant associated with a set of conditional parameters for an uplink transmission from the IAB MT to the parent node, the conditional grant associated with a triggering event that is based in part on a communication status of the IAB DU: monitoring for the uplink transmission on each of a plurality of candidate resources; and receiving the uplink transmission on some or all of the plurality of candidate resources.

Clause 10. The method of clause 9, wherein the plurality of candidate resources includes MIMO layers supported by the IAB MT for the uplink transmission based on the communication status of the IAB DU.

Clause 11. The method of clause 10, wherein the IAB node is a full-duplex capable IAB node.

Clause 12. The method of clause 11, wherein the at least one conditional parameter comprises two MIMO layers for the uplink transmission if the IAB DU is not receiving data from any child node or is receiving data from a first subset of child nodes, or wherein the at least one conditional parameter comprises a single MIMO layer for the uplink transmission if the IAB DU is receiving data from a second subset of child nodes.

Clause 13. The method of any of clauses 10 to 12, wherein the IAB node is a spatial-divisional multiplexing (SDM)-capable IAB node.

Clause 14. The method of clause 13, wherein the at least one conditional parameter comprises two MIMO layers for the uplink transmission if the IAB DU is not transmitting data to any child node, or wherein the at least one conditional parameter comprises one MIMO layer for the uplink transmission if the IAB DU is transmitting data to any child node.

Clause 15. The method of any of clauses 9 to 14, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

Clause 16. A method of operating an integrated access and backhaul (IAB) node comprising an IAB mobile terminal (MT) and an IAB distributed unit (DU), comprising: transmitting, from the IAB DU to at least one child node, a conditional grant associated with a set of conditional parameters for a downlink transmission from the IAB DU to the at least one child node, the conditional grant associated with a triggering event that is based at least in part on a communication status of the IAB MT: detecting the triggering event for triggering the conditional grant with at least one conditional parameter of the set of conditional parameters; and performing the downlink transmission in accordance with the at least one conditional parameter.

Clause 17. The method of clause 16, wherein the set of conditional parameters comprises a plurality of candidate resources associated with the uplink transmission, and wherein the at least one conditional parameter includes some or all of the plurality of candidate resources based at least in part on the communication status of the IAB MT.

Clause 18. The method of clause 17, wherein the plurality of candidate resources includes MIMO layers supported by the IAB DU for the downlink transmission based on the communication status of the IAB MT.

Clause 19. The method of clause 18, wherein the IAB node is a full-duplex capable IAB node.

Clause 20. The method of clause 19, wherein the at least one conditional parameter comprises two MIMO layers for the downlink transmission if the IAB MT is not receiving data from any parent node or is receiving data from a first subset of parent nodes, or wherein the at least one conditional parameter comprises a single MIMO layer for the downlink transmission if the IAB MT is receiving data from a second subset of parent nodes.

Clause 21. The method of any of clauses 18 to 20, wherein the IAB node is a spatial-divisional multiplexing (SDM)-capable IAB node.

Clause 22. The method of clause 21, wherein the at least one conditional parameter comprises two MIMO layers for the downlink transmission if the IAB MT is not transmitting data, or wherein the at least one conditional parameter comprises one MIMO layer for the downlink transmission if the IAB MT is transmitting data.

Clause 23. The method of any of clauses 16 to 22, wherein the set of conditional parameters includes a starting time of the downlink transmission, a number of MIMO layers, a transmission configuration indicator (TCI) state, a spatial relation indicator, a time location, a frequency location, a time-frequency location, or a combination thereof.

Clause 24. A method of operating a child node in communication with an integrated access and backhaul (IAB) network node that comprises an IAB mobile terminal (MT) and an IAB distributed unit (DU), comprising: receiving, from the IAB DU, a conditional grant associated with a set of conditional parameters for a downlink transmission from the IAB DU to the child node, the conditional grant associated with a triggering event that is based at least in part on a communication status of the IAB MT: monitoring for the downlink transmission on each of a plurality of candidate resources; and receiving the downlink transmission on some or all of the plurality of candidate resources.

Clause 25. The method of clause 24, wherein the plurality of candidate resources includes MIMO layers supported by the IAB DU for the downlink transmission based on the communication status of the IAB MT.

Clause 26. The method of clause 25, wherein the IAB node is a full-duplex capable IAB node.

Clause 27. The method of clause 26, wherein the at least one conditional parameter comprises two MIMO layers for the downlink transmission if the IAB MT is not receiving data from any parent node or is receiving data from a first subset of parent nodes, or wherein the at least one conditional parameter comprises a single MIMO layer for the downlink transmission if the IAB MT is receiving data from a second subset of parent nodes.

Clause 28. The method of any of clauses 25 to 27, wherein the IAB node is a spatial-divisional multiplexing (SDM)-capable IAB node.

Clause 29. The method of clause 28, wherein the at least one conditional parameter comprises two MIMO layers for the downlink transmission if the IAB MT is not transmitting data, or wherein the at least one conditional parameter comprises one MIMO layer for the downlink transmission if the IAB MT is transmitting data.

Clause 30. The method of any of clauses 24 to 29, wherein the set of conditional parameters includes a starting time of the downlink transmission, a number of MIMO layers, a transmission configuration indicator (TCI) state, a spatial relation indicator, a time location, a frequency location, a time-frequency location, or a combination thereof.

Clause 31. An integrated access and backhaul (IAB) node comprising an IAB mobile terminal (MT) and an IAB distributed unit (DU), comprising: a memory: at least one transceiver; and at least one processor communicatively coupled to the memory and the at least one transceiver, the at least one processor configured to: receive, via the at least one transceiver, at the IAB MT from a parent node, a conditional grant associated with a set of conditional parameters for an uplink transmission from the IAB MT to the parent node, the conditional grant associated with a triggering event that is based at least in part on a communication status of the IAB DU: detect the triggering event for triggering the conditional grant with at least one conditional parameter of the set of conditional parameters; and perform the uplink transmission in accordance with the at least one conditional parameter.

Clause 32. The IAB node of clause 31, wherein the set of conditional parameters comprises a plurality of candidate resources associated with the uplink transmission, and wherein the at least one conditional parameter includes some or all of the plurality of candidate resources based at least in part on the communication status of the IAB DU.

Clause 33. The IAB node of clause 32, wherein the plurality of candidate resources includes MIMO layers supported by the IAB MT for the uplink transmission based on the communication status of the IAB DU.

Clause 34. The IAB node of clause 33, wherein the IAB node is a full-duplex capable IAB node.

Clause 35. The IAB node of clause 34, wherein the at least one conditional parameter comprises two MIMO layers for the uplink transmission if the IAB DU is not receiving data from any child node or is receiving data from a first subset of child nodes, or wherein the at least one conditional parameter comprises a single MIMO layer for the uplink transmission if the IAB DU is receiving data from a second subset of child nodes.

Clause 36. The IAB node of any of clauses 33 to 35, wherein the IAB node is a spatial-divisional multiplexing (SDM)-capable IAB node.

Clause 37. The IAB node of any of clauses 35 to 36, wherein the at least one conditional parameter comprises two MIMO layers for the uplink transmission if the IAB DU is not transmitting data to any child node, or wherein the at least one conditional parameter comprises one MIMO layer for the uplink transmission if the IAB DU is transmitting data to any child node.

Clause 38. The IAB node of any of clauses 32 to 37, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

Clause 39. A parent node in communication with an integrated access and backhaul (IAB) network node that comprises an IAB mobile terminal (MT) and an IAB distributed unit (DU), comprising: a memory: at least one transceiver; and at least one processor communicatively coupled to the memory and the at least one transceiver, the at least one processor configured to: transmit, via the at least one transceiver, to the IAB MT, a conditional grant associated with a set of conditional parameters for an uplink transmission from the IAB MT to the parent node, the conditional grant associated with a triggering event that is based in part on a communication status of the IAB DU: monitor for the uplink transmission on each of a plurality of candidate resources; and receive, via the at least one transceiver, the uplink transmission on some or all of the plurality of candidate resources.

Clause 40. The parent node of clause 39, wherein the plurality of candidate resources includes MIMO layers supported by the IAB MT for the uplink transmission based on the communication status of the IAB DU.

Clause 41. The parent node of clause 40, wherein the IAB node is a full-duplex capable IAB node.

Clause 42. The parent node of clause 41, wherein the at least one conditional parameter comprises two MIMO layers for the uplink transmission if the IAB DU is not receiving data from any child node or is receiving data from a first subset of child nodes, or wherein the at least one conditional parameter comprises a single MIMO layer for the uplink transmission if the IAB DU is receiving data from a second subset of child nodes.

Clause 43. The parent node of any of clauses 40 to 42, wherein the IAB node is a spatial-divisional multiplexing (SDM)-capable IAB node.

Clause 44. The parent node of clause 43, wherein the at least one conditional parameter comprises two MIMO layers for the uplink transmission if the IAB DU is not transmitting data to any child node, or wherein the at least one conditional parameter comprises one MIMO layer for the uplink transmission if the IAB DU is transmitting data to any child node.

Clause 45. The parent node of any of clauses 39 to 44, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

Clause 46. An integrated access and backhaul (IAB) node comprising an IAB mobile terminal (MT) and an IAB distributed unit (DU), comprising: a memory: at least one transceiver; and at least one processor communicatively coupled to the memory and the at least one transceiver, the at least one processor configured to: transmit, via the at least one transceiver, from the IAB DU to at least one child node, a conditional grant associated with a set of conditional parameters for a downlink transmission from the IAB DU to the at least one child node, the conditional grant associated with a triggering event that is based at least in part on a communication status of the IAB MT: detect the triggering event for triggering the conditional grant with at least one conditional parameter of the set of conditional parameters; and perform the downlink transmission in accordance with the at least one conditional parameter.

Clause 47. The IAB node of clause 46, wherein the set of conditional parameters comprises a plurality of candidate resources associated with the uplink transmission, and wherein the at least one conditional parameter includes some or all of the plurality of candidate resources based at least in part on the communication status of the IAB MT.

Clause 48. The IAB node of clause 47, wherein the plurality of candidate resources includes MIMO layers supported by the IAB DU for the downlink transmission based on the communication status of the IAB MT.

Clause 49. The IAB node of clause 48, wherein the IAB node is a full-duplex capable IAB node.

Clause 50. The IAB node of clause 49, wherein the at least one conditional parameter comprises two MIMO layers for the downlink transmission if the IAB MT is not receiving data from any parent node or is receiving data from a first subset of parent nodes, or wherein the at least one conditional parameter comprises a single MIMO layer for the downlink transmission if the IAB MT is receiving data from a second subset of parent nodes.

Clause 51. The IAB node of any of clauses 48 to 50, wherein the IAB node is a spatial-divisional multiplexing (SDM)-capable IAB node.

Clause 52. The IAB node of clause 51, wherein the at least one conditional parameter comprises two MIMO layers for the downlink transmission if the IAB MT is not transmitting data, or wherein the at least one conditional parameter comprises one MIMO layer for the downlink transmission if the IAB MT is transmitting data.

Clause 53. The IAB node of any of clauses 46 to 52, wherein the set of conditional parameters includes a starting time of the downlink transmission, a number of MIMO layers, a transmission configuration indicator (TCI) state, a spatial relation indicator, a time location, a frequency location, a time-frequency location, or a combination thereof.

Clause 54. A child node in communication with an integrated access and backhaul (IAB) network node that comprises an IAB mobile terminal (MT) and an IAB distributed unit (DU), comprising: a memory: at least one transceiver; and at least one processor communicatively coupled to the memory and the at least one transceiver, the at least one processor configured to: receive, via the at least one transceiver, from the IAB DU, a conditional grant associated with a set of conditional parameters for a downlink transmission from the IAB DU to the child node, the conditional grant associated with a triggering event that is based at least in part on a communication status of the IAB MT: monitor for the downlink transmission on each of a plurality of candidate resources; and receive, via the at least one transceiver, the downlink transmission on some or all of the plurality of candidate resources.

Clause 55. The child node of clause 54, wherein the plurality of candidate resources includes MIMO layers supported by the IAB DU for the downlink transmission based on the communication status of the IAB MT.

Clause 56. The child node of clause 55, wherein the IAB node is a full-duplex capable IAB node.

Clause 57. The child node of clause 56, wherein the at least one conditional parameter comprises two MIMO layers for the downlink transmission if the IAB MT is not receiving data from any parent node or is receiving data from a first subset of parent nodes, or wherein the at least one conditional parameter comprises a single MIMO layer for the downlink transmission if the IAB MT is receiving data from a second subset of parent nodes.

Clause 58. The child node of any of clauses 55 to 57, wherein the IAB node is a spatial-divisional multiplexing (SDM)-capable IAB node.

Clause 59. The child node of clause 58, wherein the at least one conditional parameter comprises two MIMO layers for the downlink transmission if the IAB MT is not transmitting data, or wherein the at least one conditional parameter comprises one MIMO layer for the downlink transmission if the IAB MT is transmitting data.

Clause 60. The child node of any of clauses 54 to 59, wherein the set of conditional parameters includes a starting time of the downlink transmission, a number of MIMO layers, a transmission configuration indicator (TCI) state, a spatial relation indicator, a time location, a frequency location, a time-frequency location, or a combination thereof.

Clause 61. An integrated access and backhaul (IAB) node comprising an IAB mobile terminal (MT) and an IAB distributed unit (DU), comprising: means for receiving, at the IAB MT from a parent node, a conditional grant associated with a set of conditional parameters for an uplink transmission from the IAB MT to the parent node, the conditional grant associated with a triggering event that is based at least in part on a communication status of the IAB DU: means for detecting the triggering event for triggering the conditional grant with at least one conditional parameter of the set of conditional parameters; and means for performing the uplink transmission in accordance with the at least one conditional parameter.

Clause 62. The IAB node of clause 61, wherein the set of conditional parameters comprises a plurality of candidate resources associated with the uplink transmission, and wherein the at least one conditional parameter includes some or all of the plurality of candidate resources based at least in part on the communication status of the IAB DU.

Clause 63. The IAB node of clause 62, wherein the plurality of candidate resources includes MIMO layers supported by the IAB MT for the uplink transmission based on the communication status of the IAB DU.

Clause 64. The IAB node of clause 63, wherein the IAB node is a full-duplex capable IAB node.

Clause 65. The IAB node of clause 64, wherein the at least one conditional parameter comprises two MIMO layers for the uplink transmission if the IAB DU is not receiving data from any child node or is receiving data from a first subset of child nodes, or wherein the at least one conditional parameter comprises a single MIMO layer for the uplink transmission if the IAB DU is receiving data from a second subset of child nodes.

Clause 66. The IAB node of any of clauses 63 to 65, wherein the IAB node is a spatial-divisional multiplexing (SDM)-capable IAB node.

Clause 67. The IAB node of any of clauses 65 to 66, wherein the at least one conditional parameter comprises two MIMO layers for the uplink transmission if the IAB DU is not transmitting data to any child node, or wherein the at least one conditional parameter comprises one MIMO layer for the uplink transmission if the IAB DU is transmitting data to any child node.

Clause 68. The IAB node of any of clauses 62 to 67, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

Clause 69. A parent node in communication with an integrated access and backhaul (IAB) network node that comprises an IAB mobile terminal (MT) and an IAB distributed unit (DU), comprising: means for transmitting, to the IAB MT, a conditional grant associated with a set of conditional parameters for an uplink transmission from the IAB MT to the parent node, the conditional grant associated with a triggering event that is based in part on a communication status of the IAB DU: means for monitoring for the uplink transmission on each of a plurality of candidate resources; and means for receiving the uplink transmission on some or all of the plurality of candidate resources.

Clause 70. The parent node of clause 69, wherein the plurality of candidate resources includes MIMO layers supported by the IAB MT for the uplink transmission based on the communication status of the IAB DU.

Clause 71. The parent node of clause 70, wherein the IAB node is a full-duplex capable IAB node.

Clause 72. The parent node of clause 71, wherein the at least one conditional parameter comprises two MIMO layers for the uplink transmission if the IAB DU is not receiving data from any child node or is receiving data from a first subset of child nodes, or wherein the at least one conditional parameter comprises a single MIMO layer for the uplink transmission if the IAB DU is receiving data from a second subset of child nodes.

Clause 73. The parent node of any of clauses 70 to 72, wherein the IAB node is a spatial-divisional multiplexing (SDM)-capable IAB node.

Clause 74. The parent node of clause 73, wherein the at least one conditional parameter comprises two MIMO layers for the uplink transmission if the IAB DU is not transmitting data to any child node, or wherein the at least one conditional parameter comprises one MIMO layer for the uplink transmission if the IAB DU is transmitting data to any child node.

Clause 75. The parent node of any of clauses 69 to 74, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

Clause 76. An integrated access and backhaul (IAB) node comprising an IAB mobile terminal (MT) and an IAB distributed unit (DU), comprising: means for transmitting, from the IAB DU to at least one child node, a conditional grant associated with a set of conditional parameters for a downlink transmission from the IAB DU to the at least one child node, the conditional grant associated with a triggering event that is based at least in part on a communication status of the IAB MT: means for detecting the triggering event for triggering the conditional grant with at least one conditional parameter of the set of conditional parameters; and means for performing the downlink transmission in accordance with the at least one conditional parameter.

Clause 77. The IAB node of clause 76, wherein the set of conditional parameters comprises a plurality of candidate resources associated with the uplink transmission, and wherein the at least one conditional parameter includes some or all of the plurality of candidate resources based at least in part on the communication status of the IAB MT.

Clause 78. The IAB node of clause 77, wherein the plurality of candidate resources includes MIMO layers supported by the IAB DU for the downlink transmission based on the communication status of the IAB MT.

Clause 79. The IAB node of clause 78, wherein the IAB node is a full-duplex capable IAB node.

Clause 80. The IAB node of clause 79, wherein the at least one conditional parameter comprises two MIMO layers for the downlink transmission if the IAB MT is not receiving data from any parent node or is receiving data from a first subset of parent nodes, or wherein the at least one conditional parameter comprises a single MIMO layer for the downlink transmission if the IAB MT is receiving data from a second subset of parent nodes.

Clause 81. The IAB node of any of clauses 78 to 80, wherein the IAB node is a spatial-divisional multiplexing (SDM)-capable IAB node.

Clause 82. The IAB node of clause 81, wherein the at least one conditional parameter comprises two MIMO layers for the downlink transmission if the IAB MT is not transmitting data, or wherein the at least one conditional parameter comprises one MIMO layer for the downlink transmission if the IAB MT is transmitting data.

Clause 83. The IAB node of any of clauses 76 to 82, wherein the set of conditional parameters includes a starting time of the downlink transmission, a number of MIMO layers, a transmission configuration indicator (TCI) state, a spatial relation indicator, a time location, a frequency location, a time-frequency location, or a combination thereof.

Clause 84. A child node in communication with an integrated access and backhaul (IAB) network node that comprises an IAB mobile terminal (MT) and an IAB distributed unit (DU), comprising: means for receiving, from the IAB DU, a conditional grant associated with a set of conditional parameters for a downlink transmission from the IAB DU to the child node, the conditional grant associated with a triggering event that is based at least in part on a communication status of the IAB MT: means for monitoring for the downlink transmission on each of a plurality of candidate resources; and means for receiving the downlink transmission on some or all of the plurality of candidate resources.

Clause 85. The child node of clause 84, wherein the plurality of candidate resources includes MIMO layers supported by the IAB DU for the downlink transmission based on the communication status of the IAB MT.

Clause 86. The child node of clause 85, wherein the IAB node is a full-duplex capable IAB node.

Clause 87. The child node of clause 86, wherein the at least one conditional parameter comprises two MIMO layers for the downlink transmission if the IAB MT is not receiving data from any parent node or is receiving data from a first subset of parent nodes, or wherein the at least one conditional parameter comprises a single MIMO layer for the downlink transmission if the IAB MT is receiving data from a second subset of parent nodes.

Clause 88. The child node of any of clauses 85 to 87, wherein the IAB node is a spatial-divisional multiplexing (SDM)-capable IAB node.

Clause 89. The child node of clause 88, wherein the at least one conditional parameter comprises two MIMO layers for the downlink transmission if the IAB MT is not transmitting data, or wherein the at least one conditional parameter comprises one MIMO layer for the downlink transmission if the IAB MT is transmitting data.

Clause 90. The child node of any of clauses 84 to 89, wherein the set of conditional parameters includes a starting time of the downlink transmission, a number of MIMO layers, a transmission configuration indicator (TCI) state, a spatial relation indicator, a time location, a frequency location, a time-frequency location, or a combination thereof.

Clause 91. A non-transitory computer-readable medium storing computer-executable instructions that, when executed by an integrated access and backhaul (IAB) node comprising an IAB mobile terminal (MT) and an IAB distributed unit (DU), cause the IAB to: receive, at the IAB MT from a parent node, a conditional grant associated with a set of conditional parameters for an uplink transmission from the IAB MT to the parent node, the conditional grant associated with a triggering event that is based at least in part on a communication status of the IAB DU: detect the triggering event for triggering the conditional grant with at least one conditional parameter of the set of conditional parameters; and perform the uplink transmission in accordance with the at least one conditional parameter.

Clause 92. The non-transitory computer-readable medium of clause 91, wherein the set of conditional parameters comprises a plurality of candidate resources associated with the uplink transmission, and wherein the at least one conditional parameter includes some or all of the plurality of candidate resources based at least in part on the communication status of the IAB DU.

Clause 93. The non-transitory computer-readable medium of clause 92, wherein the plurality of candidate resources includes MIMO layers supported by the IAB MT for the uplink transmission based on the communication status of the IAB DU.

Clause 94. The non-transitory computer-readable medium of clause 93, wherein the IAB node is a full-duplex capable IAB node.

Clause 95. The non-transitory computer-readable medium of clause 94, wherein the at least one conditional parameter comprises two MIMO layers for the uplink transmission if the IAB DU is not receiving data from any child node or is receiving data from a first subset of child nodes, or wherein the at least one conditional parameter comprises a single MIMO layer for the uplink transmission if the IAB DU is receiving data from a second subset of child nodes.

Clause 96. The non-transitory computer-readable medium of any of clauses 93 to 95, wherein the IAB node is a spatial-divisional multiplexing (SDM)-capable IAB node.

Clause 97. The non-transitory computer-readable medium of any of clauses 95 to 96, wherein the at least one conditional parameter comprises two MIMO layers for the uplink transmission if the IAB DU is not transmitting data to any child node, or wherein the at least one conditional parameter comprises one MIMO layer for the uplink transmission if the IAB DU is transmitting data to any child node.

Clause 98. The non-transitory computer-readable medium of any of clauses 92 to 97, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

Clause 99. A non-transitory computer-readable medium storing computer-executable instructions that, when executed by an parent node in communication with an integrated access and backhaul (IAB) network node that comprises an IAB mobile terminal (MT) and an IAB distributed unit (DU), cause the IAB to: transmit, to the IAB MT, a conditional grant associated with a set of conditional parameters for an uplink transmission from the IAB MT to the parent node, the conditional grant associated with a triggering event that is based in part on a communication status of the IAB DU: monitor for the uplink transmission on each of a plurality of candidate resources; and receive the uplink transmission on some or all of the plurality of candidate resources.

Clause 100. The non-transitory computer-readable medium of clause 99, wherein the plurality of candidate resources includes MIMO layers supported by the IAB MT for the uplink transmission based on the communication status of the IAB DU.

Clause 101. The non-transitory computer-readable medium of clause 100, wherein the IAB node is a full-duplex capable IAB node.

Clause 102. The non-transitory computer-readable medium of clause 101, wherein the at least one conditional parameter comprises two MIMO layers for the uplink transmission if the IAB DU is not receiving data from any child node or is receiving data from a first subset of child nodes, or wherein the at least one conditional parameter comprises a single MIMO layer for the uplink transmission if the IAB DU is receiving data from a second subset of child nodes.

Clause 103. The non-transitory computer-readable medium of any of clauses 100 to 102, wherein the IAB node is a spatial-divisional multiplexing (SDM)-capable IAB node.

Clause 104. The non-transitory computer-readable medium of clause 103, wherein the at least one conditional parameter comprises two MIMO layers for the uplink transmission if the IAB DU is not transmitting data to any child node, or wherein the at least one conditional parameter comprises one MIMO layer for the uplink transmission if the IAB DU is transmitting data to any child node.

Clause 105. The non-transitory computer-readable medium of any of clauses 99 to 104, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

Clause 106. A non-transitory computer-readable medium storing computer-executable instructions that, when executed by an IAB, cause the IAB to: transmit, from the IAB DU to at least one child node, a conditional grant associated with a set of conditional parameters for a downlink transmission from the IAB DU to the at least one child node, the conditional grant associated with a triggering event that is based at least in part on a communication status of the IAB MT; detect the triggering event for triggering the conditional grant with at least one conditional parameter of the set of conditional parameters; and perform the downlink transmission in accordance with the at least one conditional parameter.

Clause 107. The non-transitory computer-readable medium of clause 106, wherein the set of conditional parameters comprises a plurality of candidate resources associated with the uplink transmission, and wherein the at least one conditional parameter includes some or all of the plurality of candidate resources based at least in part on the communication status of the IAB MT.

Clause 108. The non-transitory computer-readable medium of clause 107, wherein the plurality of candidate resources includes MIMO layers supported by the IAB DU for the downlink transmission based on the communication status of the IAB MT.

Clause 109. The non-transitory computer-readable medium of clause 108, wherein the IAB node is a full-duplex capable IAB node.

Clause 110. The non-transitory computer-readable medium of clause 109, wherein the at least one conditional parameter comprises two MIMO layers for the downlink transmission if the IAB MT is not receiving data from any parent node or is receiving data from a first subset of parent nodes, or wherein the at least one conditional parameter comprises a single MIMO layer for the downlink transmission if the IAB MT is receiving data from a second subset of parent nodes.

Clause 111. The non-transitory computer-readable medium of any of clauses 108 to 110, wherein the IAB node is a spatial-divisional multiplexing (SDM)-capable IAB node.

Clause 112. The non-transitory computer-readable medium of clause 111, wherein the at least one conditional parameter comprises two MIMO layers for the downlink transmission if the IAB MT is not transmitting data, or wherein the at least one conditional parameter comprises one MIMO layer for the downlink transmission if the IAB MT is transmitting data.

Clause 113. The non-transitory computer-readable medium of any of clauses 106 to 112, wherein the set of conditional parameters includes a starting time of the downlink transmission, a number of MIMO layers, a transmission configuration indicator (TCI) state, a spatial relation indicator, a time location, a frequency location, a time-frequency location, or a combination thereof.

Clause 114. A non-transitory computer-readable medium storing computer-executable instructions that, when executed by an child node in communication with an integrated access and backhaul (IAB) network node that comprises an IAB mobile terminal (MT) and an IAB distributed unit (DU), cause the IAB to: receive, from the IAB DU, a conditional grant associated with a set of conditional parameters for a downlink transmission from the IAB DU to the child node, the conditional grant associated with a triggering event that is based at least in part on a communication status of the IAB MT; monitor for the downlink transmission on each of a plurality of candidate resources; and receive the downlink transmission on some or all of the plurality of candidate resources.

Clause 115. The non-transitory computer-readable medium of clause 114, wherein the plurality of candidate resources includes MIMO layers supported by the IAB DU for the downlink transmission based on the communication status of the IAB MT.

Clause 116. The non-transitory computer-readable medium of clause 115, wherein the IAB node is a full-duplex capable IAB node.

Clause 117. The non-transitory computer-readable medium of clause 116, wherein the at least one conditional parameter comprises two MIMO layers for the downlink transmission if the IAB MT is not receiving data from any parent node or is receiving data from a first subset of parent nodes, or wherein the at least one conditional parameter comprises a single MIMO layer for the downlink transmission if the IAB MT is receiving data from a second subset of parent nodes.

Clause 118. The non-transitory computer-readable medium of any of clauses 115 to 117, wherein the IAB node is a spatial-divisional multiplexing (SDM)-capable IAB node.

Clause 119. The non-transitory computer-readable medium of clause 118, wherein the at least one conditional parameter comprises two MIMO layers for the downlink transmission if the IAB MT is not transmitting data, or wherein the at least one conditional parameter comprises one MIMO layer for the downlink transmission if the IAB MT is transmitting data.

Clause 120. The non-transitory computer-readable medium of any of clauses 114 to 119, wherein the set of conditional parameters includes a starting time of the downlink transmission, a number of MIMO layers, a transmission configuration indicator (TCI) state, a spatial relation indicator, a time location, a frequency location, a time-frequency location, or a combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating an integrated access and backhaul (IAB) node comprising an IAB mobile terminal (MT) and an IAB distributed unit (DU), comprising:
   receiving, at the IAB MT from a parent node, a conditional grant associated with a set of conditional parameters for triggering an uplink transmission from the IAB MT to the parent node on (i) both a first subset and a second subset of a plurality of candidate resources configured by the conditional grant when a first triggering event is detected and (ii) only on the first subset of the plurality of candidate resources without any uplink transmission being transmitted by the IAB node on the second subset of the plurality of candidate resources when a second triggering event is detected, the first and second triggering events based at least in part on a communication status of the IAB DU subsequent to receipt of the conditional grant;
   detecting, after the conditional grant is received, the second triggering event for triggering the conditional grant with at least one conditional parameter of the set of conditional parameters; and
   performing the uplink transmission only on (ii) the first subset of the plurality of candidate resources without any uplink transmission being transmitted by the IAB node on the second subset of the plurality of candidate resources in accordance with the at least one conditional parameter.

2. The method of claim 1,
   wherein the set of conditional parameters comprises the plurality of candidate resources associated with the uplink transmission, and wherein the at least one conditional parameter includes some or all of the plurality of candidate resources based at least in part on the communication status of the IAB DU.

3. The method of claim 2, wherein the plurality of candidate resources includes Multiple-Input Multiple-Output (MIMO) layers supported by the IAB MT for the uplink transmission based on the communication status of the IAB DU.

4. The method of claim 3, wherein the IAB node is a full-duplex capable IAB node.

5. The method of claim 4,
wherein the at least one conditional parameter comprises two MIMO layers for the uplink transmission in response to the IAB DU not receiving data from any child node or is receiving data from a first subset of child nodes, or
wherein the at least one conditional parameter comprises a single MIMO layer for the uplink transmission in response to the IAB DU receiving data from a second subset of child nodes.

6. The method of claim 3, wherein the IAB node is a spatial-divisional multiplexing (SDM)-capable IAB node.

7. The method of claim 5,
wherein the at least one conditional parameter comprises two MIMO layers for the uplink transmission in response to the IAB DU not transmitting data to any child node, or
wherein the at least one conditional parameter comprises one MIMO layer for the uplink transmission in response to the IAB DU transmitting data to any child node.

8. The method of claim 2, wherein the set of conditional parameters includes a starting time of the uplink transmission, a number of Multiple-Input Multiple-Output (MIMO) layers, a transmission configuration indicator (TCI) state, a spatial relation indicator, a time location, a frequency location, a time-frequency location, or a combination thereof.

9. A method of operating a parent node in communication with an integrated access and backhaul (IAB) network node that comprises an IAB mobile terminal (MT) and an IAB distributed unit (DU), comprising:
transmitting, to the IAB MT, a conditional grant associated with a set of conditional parameters for triggering an uplink transmission from the IAB MT to the parent node on (i) both a first subset and a second subset of a plurality of candidate resources configured by the conditional grant when a first triggering event is detected and (ii) only on the first subset of the plurality of candidate resources without any uplink transmission being transmitted by the IAB node on the second subset of the plurality of candidate resources when a second triggering event is detected, the first and second triggering events based in part on a communication status of the IAB DU subsequent to transmission of the conditional grant;
monitoring, after the conditional grant is transmitted, for the uplink transmission on each of the plurality of candidate resources; and
receiving the uplink transmission only on the first subset of the plurality of candidate resources.

10. The method of claim 9, wherein the plurality of candidate resources includes MIMO layers supported by the IAB MT for the uplink transmission based on the communication status of the IAB DU.

11. The method of claim 10, wherein the IAB node is a full-duplex capable IAB node.

12. The method of claim 11,
wherein the at least one conditional parameter comprises two MIMO layers for the uplink transmission in response to the IAB DU not receiving data from any child node or is receiving data from a first subset of child nodes, or
wherein the at least one conditional parameter comprises a single MIMO layer for the uplink transmission in response to the IAB DU receiving data from a second subset of child nodes.

13. The method of claim 10, wherein the IAB node is a spatial-divisional multiplexing (SDM)-capable IAB node.

14. The method of claim 13,
wherein the at least one conditional parameter comprises two MIMO layers for the uplink transmission in response to the IAB DU not transmitting data to any child node, or
wherein the at least one conditional parameter comprises one MIMO layer for the uplink transmission in response to the IAB DU transmitting data to any child node.

15. The method of claim 9, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

16. An integrated access and backhaul (IAB) node comprising an IAB mobile terminal (MT) and an IAB distributed unit (DU), comprising:
a memory; and
at least one processor communicatively coupled to the memory, the at least one processor configured to:
receive, at the IAB MT from a parent node, a conditional grant associated with a set of conditional parameters for triggering an uplink transmission from the IAB MT to the parent node on (i) both a first subset and a second subset of a plurality of candidate resources configured by the conditional grant when a first triggering event is detected and (ii) only on the first subset of the plurality of candidate resources without any uplink transmission being transmitted by the IAB node on the second subset of the plurality of candidate resources when a second triggering event is detected, the first and second triggering events based at least in part on a communication status of the IAB DU subsequent to receipt of the conditional grant;
detect, after the conditional grant is received, the second triggering event for triggering the conditional grant with at least one conditional parameter of the set of conditional parameters; and
perform the uplink transmission only on (ii) the first subset of the plurality of candidate resources without any uplink transmission being transmitted by the IAB node on the second subset of the plurality of candidate resources in accordance with the at least one conditional parameter.

17. The IAB node of claim 16,
wherein the set of conditional parameters comprises a plurality of candidate resources associated with the uplink transmission, and
wherein the at least one conditional parameter includes some or all of the plurality of candidate resources based at least in part on the communication status of the IAB DU.

18. The IAB node of claim 17, wherein the plurality of candidate resources includes Multiple-Input Multiple-Output (MIMO) layers supported by the IAB MT for the uplink transmission based on the communication status of the IAB DU.

19. The IAB node of claim 18, wherein the IAB node is a full-duplex capable IAB node.

20. The IAB node of claim 19,
wherein the at least one conditional parameter comprises two MIMO layers for the uplink transmission in response to the IAB DU not receiving data from any child node or is receiving data from a first subset of child nodes, or
wherein the at least one conditional parameter comprises a single MIMO layer for the uplink transmission in response to the IAB DU receiving data from a second subset of child nodes.

21. The IAB node of claim 18, wherein the IAB node is a spatial-divisional multiplexing (SDM)-capable IAB node.

22. The IAB node of claim 20,
wherein the at least one conditional parameter comprises two MIMO layers for the uplink transmission in response to the IAB DU not transmitting data to any child node, or
wherein the at least one conditional parameter comprises one MIMO layer for the uplink transmission in response to the IAB DU transmitting data to any child node.

23. The IAB node of claim 17, wherein the set of conditional parameters includes a starting time of the uplink transmission, a number of Multiple-Input Multiple-Output (MIMO) layers, a transmission configuration indicator (TCI) state, a spatial relation indicator, a time location, a frequency location, a time-frequency location, or a combination thereof.

24. A parent node, comprising:
a memory; and
at least one processor communicatively coupled to the memory, the at least one processor configured to:
transmit, to the IAB MT, a conditional grant associated with a set of conditional parameters for triggering an uplink transmission from the IAB MT to the parent node on (i) both a first subset and a second subset of a plurality of candidate resources configured by the conditional grant when a first triggering event is detected and (ii) only on the first subset of the plurality of candidate resources without any uplink transmission being transmitted by the IAB node on the second subset of the plurality of candidate resources when a second triggering event is detected, the first and second triggering events that is based in part on a communication status of the IAB DU subsequent to transmission of the conditional grant;
monitor, after the conditional grant is transmitted, for the uplink transmission on each of the plurality of candidate resources; and
receive the uplink transmission only on the first subset of the plurality of candidate resources.

25. The parent node of claim 24, wherein the plurality of candidate resources includes MIMO layers supported by the IAB MT for the uplink transmission based on the communication status of the IAB DU.

26. The parent node of claim 25, wherein the IAB node is a full-duplex capable IAB node.

27. The parent node of claim 26,
wherein the at least one conditional parameter comprises two MIMO layers for the uplink transmission in response to the IAB DU not receiving data from any child node or is receiving data from a first subset of child nodes, or
wherein the at least one conditional parameter comprises a single MIMO layer for the uplink transmission in response to the IAB DU receiving data from a second subset of child nodes.

28. The parent node of claim 25, wherein the IAB node is a spatial-divisional multiplexing (SDM)-capable IAB node.

29. The parent node of claim 28,
wherein the at least one conditional parameter comprises two MIMO layers for the uplink transmission in response to the IAB DU not transmitting data to any child node, or
wherein the at least one conditional parameter comprises one MIMO layer for the uplink transmission in response to the IAB DU transmitting data to any child node.

30. The parent node of claim 24, wherein the set of conditional parameters includes a starting time of the uplink transmission, a number of MIMO layers, a transmission configuration indicator (TCI) state, a spatial relation indicator, a time location, a frequency location, a time-frequency location, or a combination thereof.

* * * * *